US011448042B1

(12) United States Patent
Glaesman et al.

(10) Patent No.: US 11,448,042 B1
(45) Date of Patent: Sep. 20, 2022

(54) EXPANDABLE METAL FOR JUNCTION LOCKING AND JUNCTION SEALANT APPLICATIONS

(71) Applicant: Halliburton Energy Services, Inc., Houston, TX (US)

(72) Inventors: Chad W. Glaesman, Carrollton, TX (US); Karthik Krishnan, Carrollton, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/480,378

(22) Filed: Sep. 21, 2021

(51) Int. Cl.
*E21B 17/042* (2006.01)
*F16L 15/04* (2006.01)
*E21B 43/10* (2006.01)
*E21B 17/043* (2006.01)

(52) U.S. Cl.
CPC .......... *E21B 43/106* (2013.01); *E21B 17/043* (2013.01)

(58) Field of Classification Search
CPC .... E21B 17/042; E21B 43/106; E21B 17/043; F16L 13/168; F16L 15/001; F16L 15/00; F16L 15/04; F16L 15/08
See application file for complete search history.

(56) References Cited

U.S. PATENT DOCUMENTS

| | | | | |
|---|---|---|---|---|
| 1,728,786 A | * | 9/1929 | Colby | H01R 43/16 148/285 |
| 3,309,313 A | * | 3/1967 | Callahan, Jr. | C10M 5/00 252/378 R |
| 3,322,446 A | * | 5/1967 | Koziol | C25B 9/65 264/80 |
| 3,653,675 A | * | 4/1972 | Schaefer | F16J 15/14 277/944 |
| 6,106,024 A | | 8/2000 | Herman et al. | |
| 6,840,325 B2 | | 1/2005 | Stephenson | |
| 7,571,936 B2 | * | 8/2009 | Schneider | F16B 33/004 285/333 |

(Continued)

FOREIGN PATENT DOCUMENTS

| | | |
|---|---|---|
| EP | 1910728 B1 | 9/2009 |
| GB | 2444060 A | 5/2008 |
| KR | 20080096576 | 10/2008 |

OTHER PUBLICATIONS

Wack, H., et al., "Water-Swellable Materials-Application in Self-Healing Sealing Systems," Proceedings of the First International Conference on Self Healing Materials, Apr. 18-20, 2007, 9 pages, Springer.

*Primary Examiner* — Kipp C Wallace
(74) *Attorney, Agent, or Firm* — Scott Richardson; Parker Justiss, P.C.

(57) ABSTRACT

Provided is a junction, a method for forming a junction, and a well system including a junction. The junction, in one aspect, includes a first threaded member, the first member formed of a first material, and a second threaded member threaded with the first threaded member, the second threaded member formed of a second material. In one or more aspects, the first and second threaded members define an overlapping space. In one or more other aspects, an expandable metal joint is located in at least a portion of the overlapping space, the expandable metal joint comprising a metal configured to expand in response to hydrolysis.

23 Claims, 31 Drawing Sheets

(56) References Cited

U.S. PATENT DOCUMENTS

| | | | |
|---|---|---|---|
| 7,578,043 B2 | 8/2009 | Simpson et al. | |
| 8,042,841 B2 | 10/2011 | Viegener | |
| 9,771,510 B2 * | 9/2017 | James | C09K 8/5086 |
| 2004/0017081 A1 * | 1/2004 | Simpson | E21B 17/042 |
| | | | 285/333 |
| 2004/0060706 A1 * | 4/2004 | Stephenson | E21B 17/042 |
| | | | 166/207 |
| 2005/0093250 A1 * | 5/2005 | Santi | E21B 43/103 |
| | | | 277/602 |
| 2007/0035130 A1 * | 2/2007 | Hashem | F16L 15/003 |
| | | | 285/333 |
| 2009/0123226 A1 * | 5/2009 | Viegener | F16L 15/001 |
| | | | 403/268 |
| 2009/0236850 A1 * | 9/2009 | Goto | C23C 28/00 |
| | | | 285/333 |
| 2010/0096143 A1 * | 4/2010 | Angman | E21B 17/1085 |
| | | | 166/380 |
| 2012/0049462 A1 * | 3/2012 | Pitman | F16J 15/068 |
| | | | 277/627 |
| 2012/0261127 A1 * | 10/2012 | Zhou | E21B 21/103 |
| | | | 166/118 |
| 2015/0192229 A1 * | 7/2015 | Goto | E21B 17/042 |
| | | | 285/94 |
| 2016/0040038 A1 * | 2/2016 | Cornelissen | C09D 5/00 |
| | | | 427/386 |
| 2016/0145488 A1 | 5/2016 | Aines et al. | |
| 2016/0168451 A1 * | 6/2016 | Potapenko | E21B 43/26 |
| | | | 166/280.2 |
| 2018/0187529 A1 * | 7/2018 | Di Crescenzo | E21B 17/1042 |
| 2019/0316025 A1 * | 10/2019 | Sherman | E21B 33/138 |
| 2020/0240235 A1 * | 7/2020 | Fripp | E21B 34/06 |
| 2020/0032574 A1 | 10/2020 | Fripp et al. | |
| 2020/0325749 A1 * | 10/2020 | Fripp | F16J 15/068 |
| 2020/0362224 A1 * | 11/2020 | Wellhoefer | C09K 8/5086 |

* cited by examiner

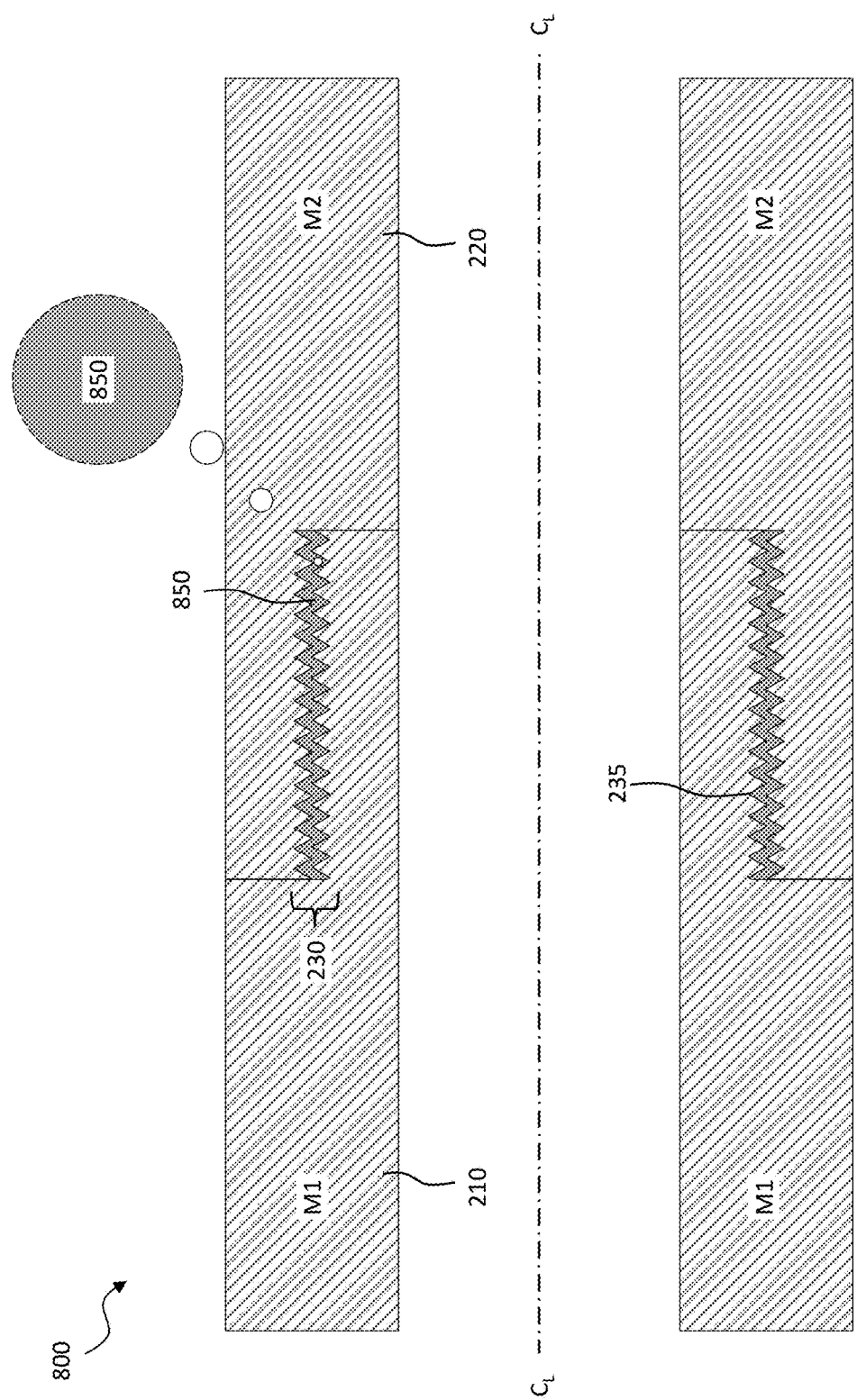

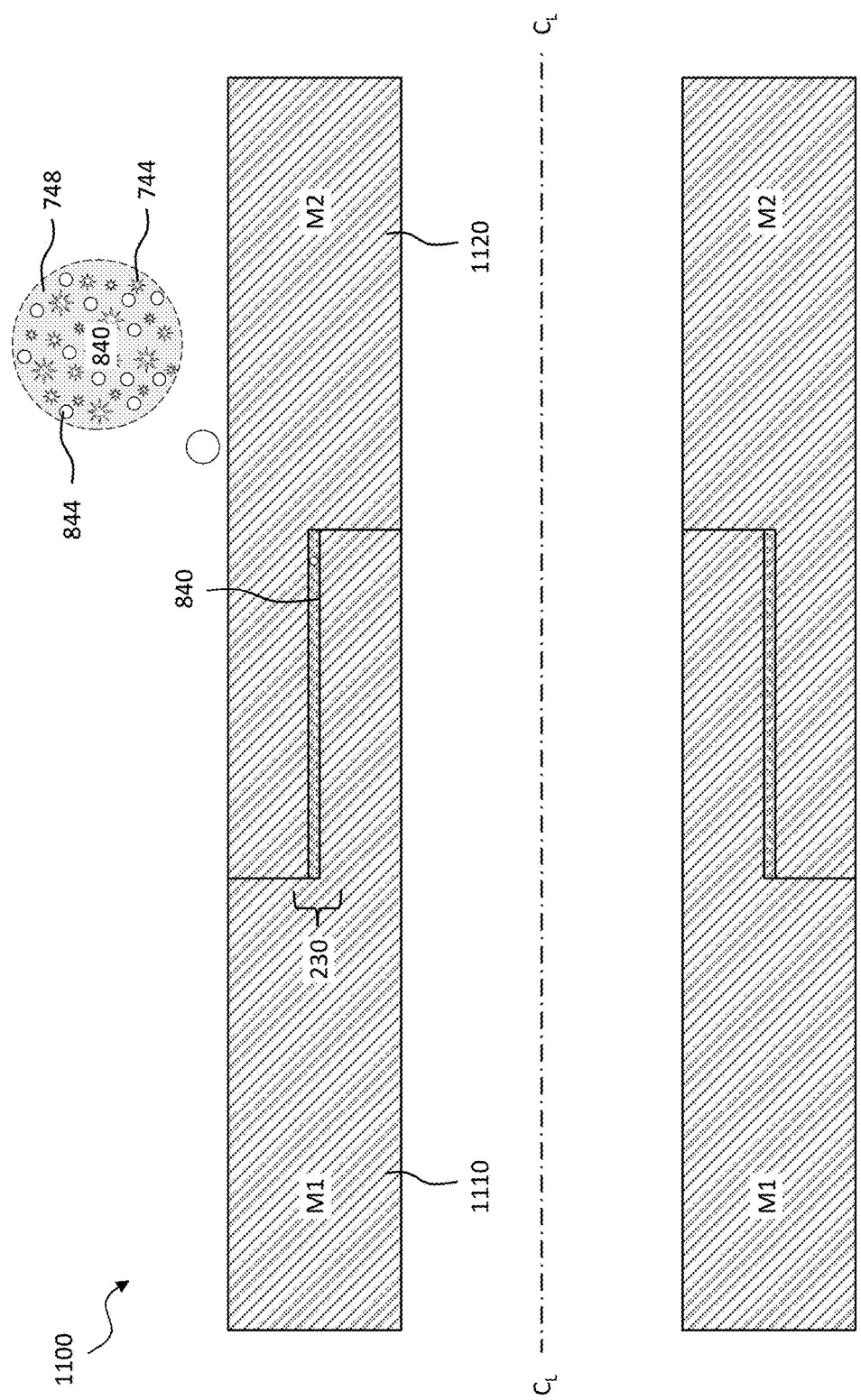

EXPANDABLE METAL FOR JUNCTION LOCKING AND JUNCTION SEALANT APPLICATIONS

BACKGROUND

Traditional junctions that perform anchoring and/or sealing between two different parts may be achieved by using a combination of geometric mechanical joining methods, and sealing elements or inserts (e.g., elastomeric/plastic/metal). For example, geometric mechanical joining methods including non-sealing threads, snap rings, collets, Ratch Latch™, lock rings, bolting/riveting and other type of latching methods are often used. In other instances, sealing and/or anchoring maybe achieved by using special sealing threads, such as premium threads or torqued connections, but typically only on round tubular geometries. Other traditional methods of joining to enable anchoring and/or sealing include friction/interference/shrink fits, swaging, welding/brazing and similar fusion methods.

BRIEF DESCRIPTION

Reference is now made to the following descriptions taken in conjunction with the accompanying drawings, in which:

FIGS. 8A through 8C illustrate an alternative embodiment of a junction designed, manufactured and operated according to one embodiment of the disclosure;

FIGS. 11A through 11C illustrate an alternative embodiment of a junction designed, manufactured and operated according to one embodiment of the disclosure.

DETAILED DESCRIPTION

Figure 1:
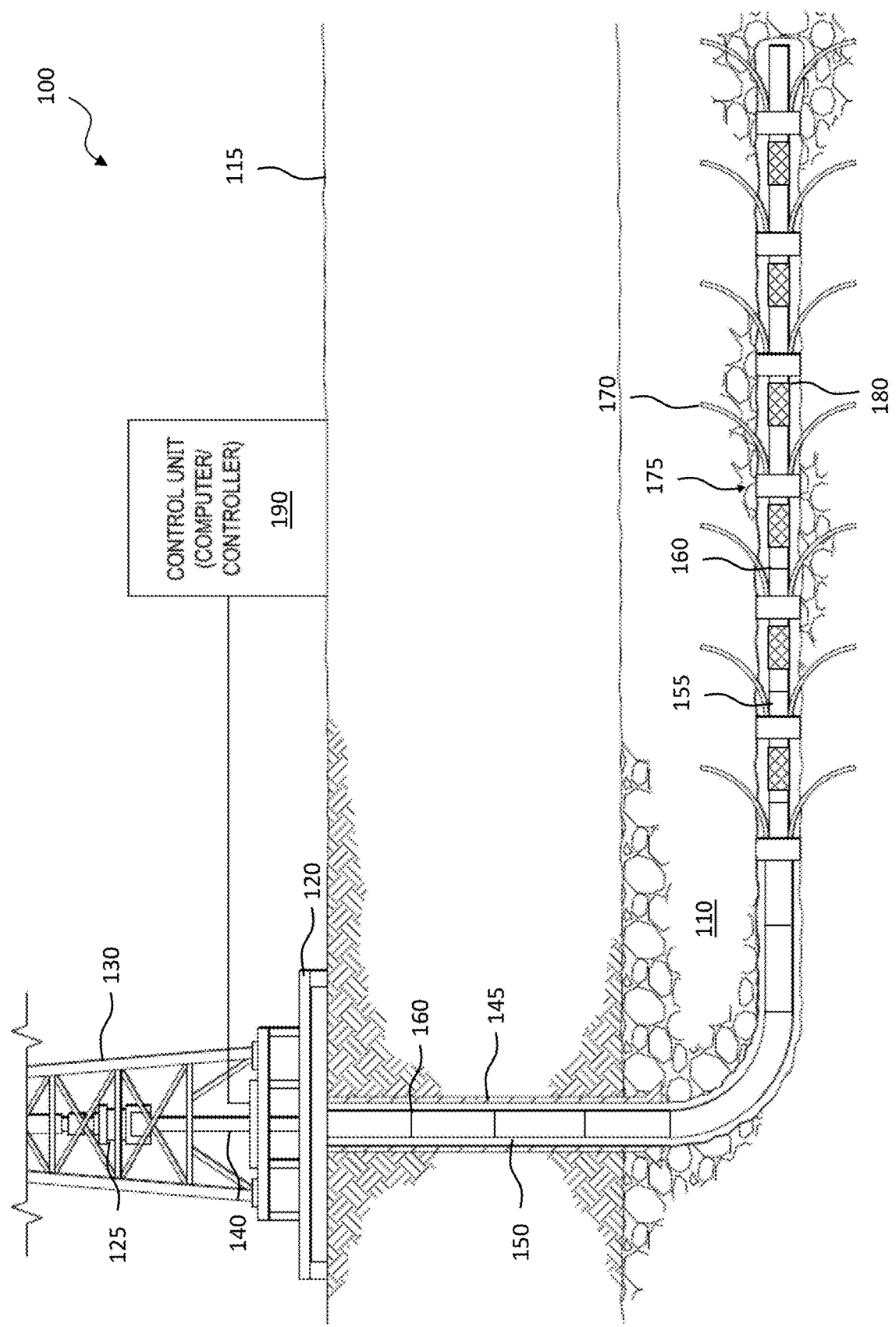
FIG. 1 illustrates a well system designed, manufactured, and operated according to one or more embodiments of the disclosure.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the ground; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

The present disclosure describes a method for joining two or more similar and/or dissimilar materials using a novel expandable metal, for example to help strengthen and/or seal the junction (e.g., joint in one application). As will be understood more fully below, the expandable metal begins as a metal, and after being subjected to a reactive fluid, changes to a hard, fluid impermeable material. In certain embodiments, the hard, fluid impermeable material contains a certain amount of unreacted expandable metal, and thus may be self-healing and/or self-repairing.

The expandable metal has many different applications when joining two members together, as well as provides certain advantages (e.g., incremental and/or radical advantages) over existing junctions. For example, the expandable metal may be used to join any combination of two or more members with various shapes and different interfacing/mating geometries, either as a primary junction and/or seal, or as a back-up junction and/or seal to currently available methods. Additionally, the expandable metal may have certain in-situ healing and/or/repairing properties, if for example degradation of the junction subsequently occurs. The expandable metal may be used to join round, circular but not round, or other mathematical geometries. Additionally, the expandable metal may be used along with threaded members, as well as with lock-rings, seal-rings, latches, etc., to attach and seal, while maintaining for example 360-degree contact.

Ultimately, expandable metal joints (e.g., anchored and/or sealed joints) offer cost effective and relatively quick in-house solutions (applied at the time of assembly, for example applied uphole but activated downhole—which allows for the tubular connection and related junction to be broken and reassembled many times at the surface, as the activation does not occur until downhole; applied uphole but activated prior to being placed downhole; applied downhole and activated downhole; etc.) for joining two or more members, along with threaded fasteners, or alternatively in place of interference/shrink fits or welding/brazing, among others.

Accordingly, in at least one embodiment the expandable metal joints may be used as a thread treatment to improve the material-to-material sealing (e.g., metal-to-metal sealing). For example, the simplicity of the application of the expandable metal joints can be used either as a replacement to more expensive sealing connections or as a supplement to current premium designs. Additionally, cheaper straight threads employing the expandable metal joint may provide the performance normally achieved by premium threads. Moreover, metal-to-metal premium sealing connections would be less sensitive to surface finish and tolerancing and will therefore improve the reliability of these connections. Furthermore, more robust metal-to-metal connections would simplify assembly, as material properties and assembly details are less critical to the performance.

Additionally, expanded metal joints may be used in certain applications where the heat required to weld or braze two surfaces together negatively affects the metallurgy of the surfaces. For instance, in certain high $H_2S$ or $CO_2$ applications, the features of the well must be manufactured according to National Association of Corrosion Engineers (NACE) standards. Unfortunately, the heat required to weld or braze the two surfaces together damage the corrosion resistance of the two surfaces, which means they no longer meet the NACE standard, and thus cannot be used. Nevertheless, the expanded metal joints function the same way as the welded or brazed joints, if not better, and do not require the extreme heat to form the same. Accordingly, the expanded metal joints could be used and still meet the NACE standard.

FIG. 1 illustrates a well system 100 designed, manufactured, and operated according to one or more embodiments of the disclosure, and including one or more expandable metal joints or expanded metal joints 160 according to any of the embodiments, aspects, applications, variations, designs, etc. disclosed in the following paragraphs. The well system 100 in at least one embodiment includes a platform 120 positioned over a subterranean formation 110 located below the earth's surface 115. The platform 120, in at least one embodiment, has a hoisting apparatus 125 and a derrick 130 for raising and lowering a downhole conveyance 140, such as a drill string, casing string, tubing string, coiled tubing, etc. Although a land-based oil and gas platform 120 is illustrated in FIG. 1, the scope of this disclosure is not thereby limited, and thus could potentially apply to offshore applications. The teachings of this disclosure may also be applied to other land-based multilateral wells different from that illustrated.

The well system 100 in one or more embodiments includes a main wellbore 145. The main wellbore 145, in the illustrated embodiment, includes tubing 150, 155, which may have differing tubular diameters. In at least one embodiment, the tubing 150, 155 includes expandable metal joints or expanded metal joints 160 according to one or more embodiments of the disclosure. Extending from the main wellbore 145, in one or more embodiments, may be one or more lateral wellbores 170. Furthermore, a plurality of multilateral junctions 175 may be positioned at junctions between the main wellbore 145 and the lateral wellbores 170. Each multilateral junction 175 may comprise a y-block designed, manufactured or operated according to the disclosure. The multilateral junctions 175, in one or more embodiments, may include expandable metal or expanded metal according to any of the embodiments, aspects, applications, variations, designs, etc. disclosed in the following paragraphs, including the use of expandable metal or expanded metal for the joints therein.

The well system 100 may additionally include one or more ICVs 180 positioned at various positions within the main wellbore 145 and/or one or more of the lateral wellbores 170. The ICVs 180 may comprise an ICV designed, manufactured or operated according to the disclosure. As discussed above, one or more of the ICVs 180 could include expandable metal or expanded metal according to any of the embodiments, aspects, applications, variations, designs, etc. disclosed in the following paragraphs, for example with respect to any of the junctions within the ICVs 180. While the ICVs 180 have been illustrated and described, other embodiments exist wherein one or more ICDs, AICDs, screens, etc. may be used in addition to or in place of one or more of the ICVs 180 illustrated in FIG. 1. The ICDs, AICDs, screens, etc. might also include expandable metal or expanded metal according to any of the embodiments, aspects, applications, variations, designs, etc. disclosed in the following paragraphs, The well system 100 may additionally include a control unit 190. The control unit 190, in this embodiment, is operable to provide control to or received signals from, one or more downhole devices.

In certain embodiments, one or more portions of the well system 100 may include one or more expandable metal joints or expanded metal joints (e.g., anchor, seal, or anchor and seal joints) that were formed with pre-expansion metal (e.g., metal configured to expand in response to hydrolysis) in accordance with one or more embodiments of the disclosure. After the pre-expansion metal has been subjected to a reactive fluid, the one or more junctions would include expanded metal in accordance with one or more embodiments of the disclosure.

The expanded metal joint, in at least one embodiment, expands to at least partially fill the overlapping space between the two or more features that are being joined. The overlapping space in at least one embodiment includes the space created between opposing surfaces of the two or more features, regardless of the relative orientation (e.g., parallel with the longitudinal axis of the two or more features, perpendicular with the longitudinal axis of the two or more features, or angled relative to the longitudinal axis of the two or more features). In certain embodiments, the expanded metal joint expands to generally fill the overlapping space. The phrase generally fill, as that term is used herein, is intended to convey that at least 20 percent of the overlapping space is filled. In other embodiments, the expanded metal joint expands to substantially fill, and in yet other embodiments expands to excessively fill, the overlapping space between the two or more features that are being joined. The phrase substantially fill, as that term is used herein, is intended to convey that at least 50 percent of the overlapping space is filled, and the phrase excessively fill, as that term is used herein, is intended to convey that at least 75 percent of the overlapping space is filled.

The expanded metal joint in the overlapping space, in one or more embodiments, has a volume of no more than 25,000 $cm^3$. In yet another embodiment, the overlapping space has a volume of no more than 7,750 $cm^3$. In certain embodiments, the expanded metal joint has a volume ranging from about 31.5 $mm^3$ to about 5,813 $cm^3$. In yet another embodiment, the expanded metal joint has a volume ranging from about 4,282 $mm^3$ to about 96,700 $mm^3$. Nevertheless, the volume of the expanded metal joint should be designed to provide an adequate anchor and/or seal for the two or more features being joined (e.g., without overly expanding to the areas outside of the overlapping space), but otherwise is not limited to any specific values.

Again, in certain embodiments, the expanded metal joint includes residual unreacted expandable metal therein. For example, in certain embodiments the expanded metal joint is intentionally designed to include the residual unreacted expandable metal therein. The residual unreacted expandable metal has the benefit of allowing the expanded metal joint to self-heal if cracks or other anomalies subsequently arise. Nevertheless, other embodiments may exist wherein no residual unreacted expandable metal exists in the expanded metal joint.

The expandable metal, in some embodiments, may be described as expanding to a cement like material. In other words, the metal goes from metal to micron-scale particles and then these particles expand and lock together to, in essence, lock the expanded metal joint in place. The reaction may, in certain embodiments, occur in less than two days (e.g., less than 24 hours in certain instances) in a reactive fluid and acceptable temperatures. Nevertheless, the time of reaction may vary depending on the reactive fluid, the expandable metal used, the downhole temperature, and surface-area-to-volume ratio (SA:V) of the expandable metal.

In some embodiments, the reactive fluid may be a brine solution such as may be produced during well completion activities, and in other embodiments, the reactive fluid may be one of the additional solutions discussed herein. The expandable metal is electrically conductive in certain embodiments. The expandable metal, in certain embodiments, has a yield strength greater than about 8,000 psi, e.g., 8,000 psi+/−50%.

The hydrolysis of the expandable metal can create a metal hydroxide. The formative properties of alkaline earth metals (Mg—Magnesium, Ca—Calcium, etc.) and transition metals (Zn—Zinc, Al—Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

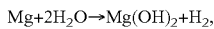
$$Mg+2H_2O \rightarrow Mg(OH)_2+H_2,$$

where $Mg(OH)_2$ is also known as brucite. Another hydration reaction uses aluminum hydrolysis. The reaction forms a material known as Gibbsite, bayerite, boehmite, aluminum oxide, and norstrandite, depending on form. The possible hydration reactions for aluminum are:

$$Al+3H_2O \rightarrow Al(OH)_3+3/2H_2.$$

$$Al+2H_2O \rightarrow Al\,O(OH)+3/2H_2$$

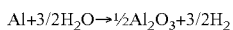
$$Al+3/2H_2O \rightarrow \tfrac{1}{2}Al_2O_3+3/2H_2$$

Another hydration reaction uses calcium hydrolysis. The hydration reaction for calcium is:

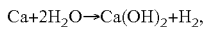
$$Ca+2H_2O \rightarrow Ca(OH)_2+H_2,$$

Where $Ca(OH)_2$ is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases. Alkaline earth metals (e.g., Mg, Ca, etc.) work well for the expandable metal, but transition metals (Al, etc.) also work well for the expandable metal. In one embodiment, the metal hydroxide is dehydrated by the swell pressure to form a metal oxide.

In an embodiment, the expandable metal used can be a metal alloy. The expandable metal alloy can be an alloy of the base expandable metal with other elements in order to either adjust the strength of the expandable metal alloy, to adjust the reaction time of the expandable metal alloy, or to adjust the strength of the resulting metal hydroxide byproduct, among other adjustments. The expandable metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the expandable metal alloy can be alloyed with a dopant that promotes corrosion, such as Ni—Nickel, Fe—Iron, Cu—Copper, Co—Cobalt, Ir—Iridium, Au—Gold, C—Carbon, Ga—Gallium, In—Indium, Mg—Mercury, Bi—Bismuth, Sn—Tin, and Pd—Palladium.

Optionally, non-expanding components may be added to the starting metallic materials. For example, ceramic, elastomer, plastic, epoxy, glass, or non-reacting metal components can be embedded in the expandable metal or coated on the surface of the expandable metal. In yet other embodiments, the non-expanding components are metal fibers, a composite weave, a polymer ribbon, or ceramic granules, among others.

Alternatively, the starting expandable metal may be the metal oxide. For example, calcium oxide (CaO) with water will produce calcium hydroxide in an energetic reaction. Due to the higher density of calcium oxide, this can have a 260% volumetric expansion (e.g., converting 1 mole of CaO may cause the volume to increase from 9.5 cc to 34.4 cc). In one variation, the expandable metal is formed in a serpentinite reaction, a hydration and metamorphic reaction. In one variation, the resultant material resembles a mafic material. Additional ions can be added to the reaction, including silicate, sulfate, aluminate, carbonate, and phosphate. The metal can be alloyed to increase the reactivity or to control the formation of oxides. The expandable metal alloy can be constructed in a solid solution process where the elements are combined with molten metal or metal alloy. Alternatively, the expandable metal alloy could be constructed with a powder metallurgy process. The metal alloy can be a mixture of the metal and metal oxide. For example, a powder mixture of aluminum and aluminum oxide can be ball-milled together to increase the reaction rate. The expandable metal can be formed using a variety of other different processes. For example, the expandable metal can be cast, forged, extruded, sintered, welded, mill machined, lathe machined, stamped, 3D printed, eroded or a combination thereof. In at least one other embodiment, the expandable metal is deposited (e.g., plated, electroplated, CVD deposited, etc.) on one or more portions of the junction.

The expandable metal may also take on different shapes and/or configurations and remain within the scope of the disclosure. In at least one embodiment, the expandable metal is shaped into a thin sheet of expandable metal that may be placed around one portion of the junction, much like Teflon tape would be placed around a threaded junction. In at least one other embodiment, the thin sheet of expandable metal might have an adhesive on at least one side thereof. In at least one embodiment, the thin sheet of expandable metal would have a thickness ($t_s$) ranging from 2.5 μm to 2500 μm. In yet another embodiment, the thin sheet of expandable metal would have a thickness ($t_s$) ranging from 10 μm to 250 μm, and in yet another embodiment the thin sheet of expandable metal would have a thickness ($t_s$) ranging from 15 μm to 30 μm. Furthermore, in at least one embodiment the thin sheet of expandable metal would have a width ($w_s$) ranging from 6 mm to 90 cm, and in certain embodiments would be wound back upon itself in a tape like fashion (e.g., similar to the way adhesive tape and/or Teflon tape is wound back upon itself, for example including a central member, and protective cover). In yet another embodiment, the thin sheet of expandable metal would have a width ($w_s$) ranging from 25 mm to 45 cm, and in yet another embodiment would have a width ($w_s$) ranging from 100 mm to 30 cm. Furthermore, when the thin sheet of expandable metal is wound like tape, it might have a length ($l_s$) of at least 5 m long. In yet another embodiment, the thin sheet of expandable metal might have a length ($l_s$) of at least 16 m long, and in yet another embodiment at least 32 m long.

In yet another embodiment, the expandable metal may be shaped into a single long member, multiple short members, rings, among others, that may fit around one portion of the junction. In another embodiment, the expandable metal may be shaped into a long wire of expandable metal, that can be in turn be wound around a portion of the junction. The wire diameters do not need to be of circular cross-section, but may be of any cross-section. For example, the cross-section of the wire could be oval, rectangle, star, hexagon, keystone, hollow braided, woven, twisted, among others, and remain within the scope of the disclosure. In at least one embodiment, the wire of expandable metal would have a minimum diameter ($d_w$) ranging from 2.5 µm to 2500 µm. The term minimum diameter, as that term is used, is intended to mean the minimum cross-sectional length intersecting a center point of the wire, regardless of the cross-sectional shape. In yet another embodiment, the wire of expandable metal would have a minimum diameter ($d_w$) ranging from 10 µm to 250 µm, and in yet another embodiment the wire of expandable metal would have a minimum diameter ($d_w$) ranging from 15 µm to 30 µm. Furthermore, in at least one embodiment the wire of expandable metal would have a length ($l_w$) of at least 5 m long, and would be wound back upon itself in a solder like fashion (e.g., similar to the way solder is wound back upon itself, for example including a central member). In yet another embodiment, the wire of expandable metal might have a length ($l_w$) of at least 16 m long, and in yet another embodiment at least 32 m long.

In certain other embodiments, the expandable metal is a collection of individual separate chunks of the metal held together with a carrier and/or binding agent. For example, the individual separate chunks of the metal may be suspended in a paste or gel. The paste and/or gel, in at least one embodiment, may include a desiccant (e.g., a hydroscopic substance used as a drying agent) to delay any reactions. In yet another embodiment, the individual separate chunks or metal may be suspended in a non-water-based grease or wax (e.g., hydrocarbon-based grease or wax), a polymer, or an emulsion, all of which lose viscosity with increased temperature. In at least one embodiment, the paste, gel, grease or wax has a viscosity ranging from 5,000 cP to 5,000,000 cP at 25° C. In yet another embodiment, the paste, gel, grease or wax has a viscosity ranging from 50,000 cP to 500,000 cP at 25° C., and in yet another embodiment the paste, gel, grease or wax has a viscosity ranging from 100,000 cP to 300,000 cP at 25° C.

In certain embodiments, the collection of individual separate chunks of the expandable metal are a collection of individual separate different sized chunks of expandable metal. For example, in certain embodiments, a first volume of a largest of the collection of individual separate chunks of the expandable metal is at least 5 times a second volume of a smallest of the collection of individual separate chunks of the expandable metal. In another embodiment, a first volume of a largest of the collection of individual separate chunks of the expandable metal is at least 50 times a second volume of a smallest of the collection of individual separate chunks of the expandable metal. Furthermore, while certain embodiments employ different sized chunks of expandable metal, other embodiments exist wherein each of the chunks of expandable metal are substantially (e.g., with 10%) the same. Moreover, in certain embodiments, the collection of individual separate chunks of expandable metal may comprise two or more different expandable metals or an expandable metal and a metal oxide.

In certain other embodiments, the collection of individual separate chunks of the metal, whether combined as a paste, gel, grease or wax, additionally includes a plurality of microspheres of encapsulated reactive fluid. The plurality of microspheres of encapsulated reactive fluid could be a plurality of microspheres of water, such as is often used in the cosmetic industry. The reactive fluid is often encapsulated in a polymer shell (e.g., an epoxy). However, in other embodiments, the reactive fluid is encapsulated in a hydrophobic shell (e.g., such as a Janus particle), a glass shell, an emulsion shell, etc. In at least one embodiment, the plurality of microspheres of encapsulated reactive fluid have a diameter ($d_m$) ranging from 2 µm to 2,000 µm. In at least one other embodiment, the plurality of microspheres of encapsulated reactive fluid have a diameter ($d_m$) ranging from 50 µm to 1,000 µm, and in yet another embodiment the plurality of microspheres of encapsulated reactive fluid have a diameter ($d_m$) ranging from 100 inn to 200 µm.

In operation, the plurality of microspheres of encapsulated reactive fluid would remain intact prior to the two different members being brought together, but would burst when the two different members of the junction are brought into contact with one another, and thus start the conversion of the expandable metal joint into an expanded metal joint. In at least one embodiment, wherein the two different members are two different threaded members, the threading of the two members together may burst the plurality of units of encapsulated reactive fluid to start the reaction.

In certain other embodiments, the expandable metal is a powder of expandable metal. For example, the powder of expandable metal might be similar to powdered graphite, but the powder is constructed using expandable metal.

Further to the embodiments discussed above, a delay coating may be applied to one or more portions of the expandable metal to delay the expanding reactions. In one embodiment, the material configured to delay the hydrolysis process is a fusible alloy. In another embodiment, the material configured to delay the hydrolysis process is a eutectic material. In yet another embodiment, the material configured to delay the hydrolysis process is a wax, oil, or other non-reactive material.

Figure 2A:
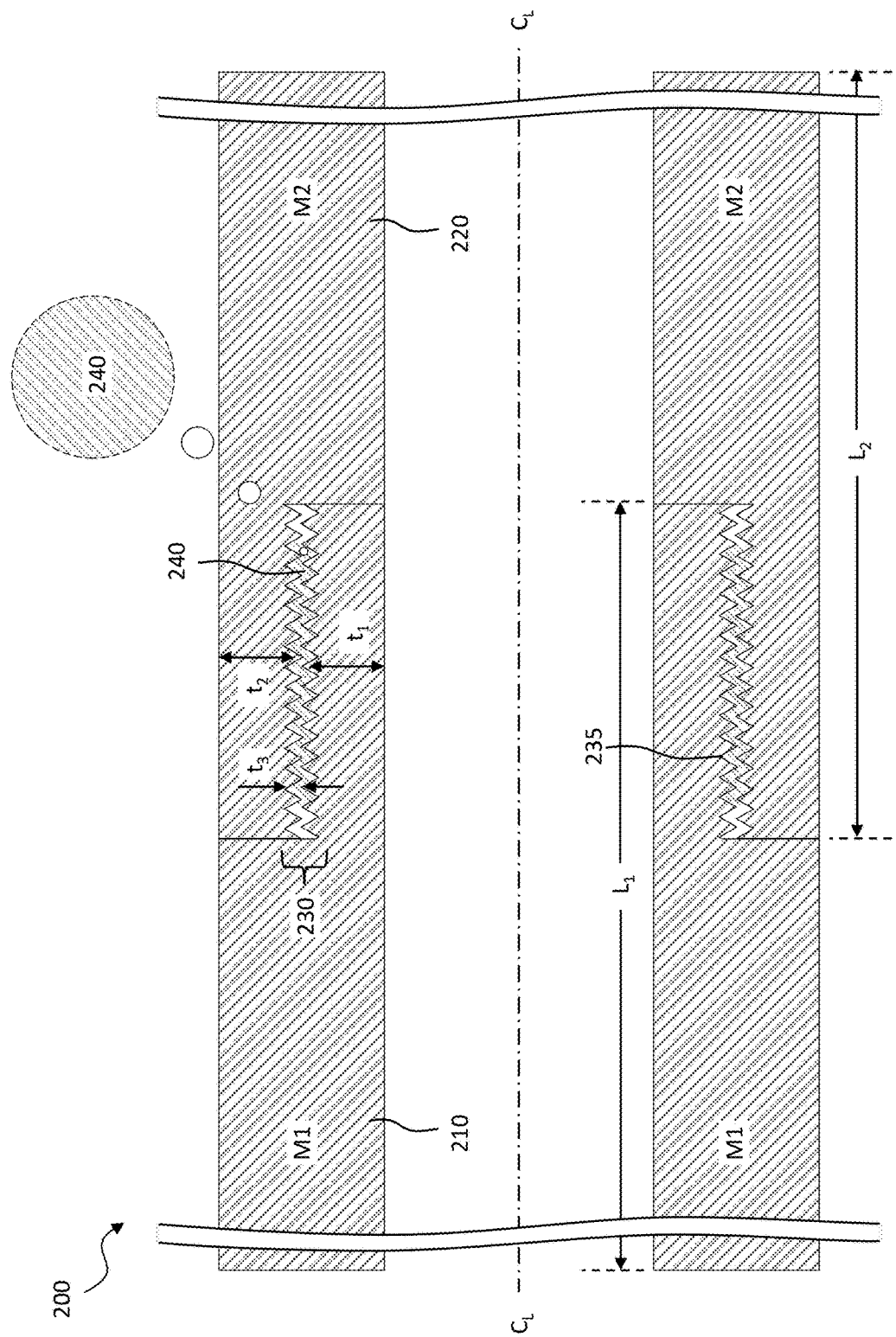
FIGS. 2A through 2C illustrate one embodiment of a junction designed, manufactured and operated according to one embodiment of the disclosure.
Figure 2B:
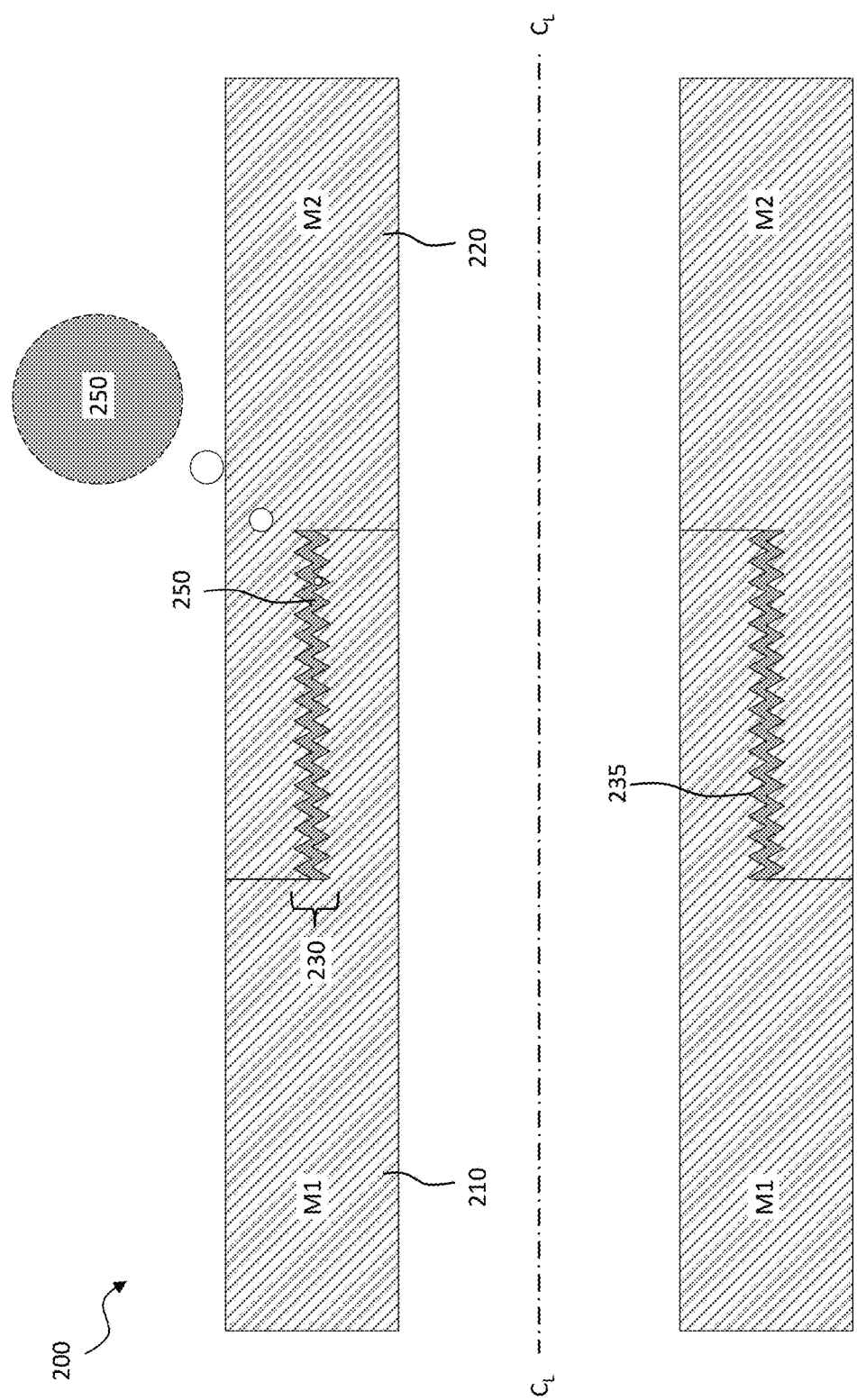
Figure 2C:
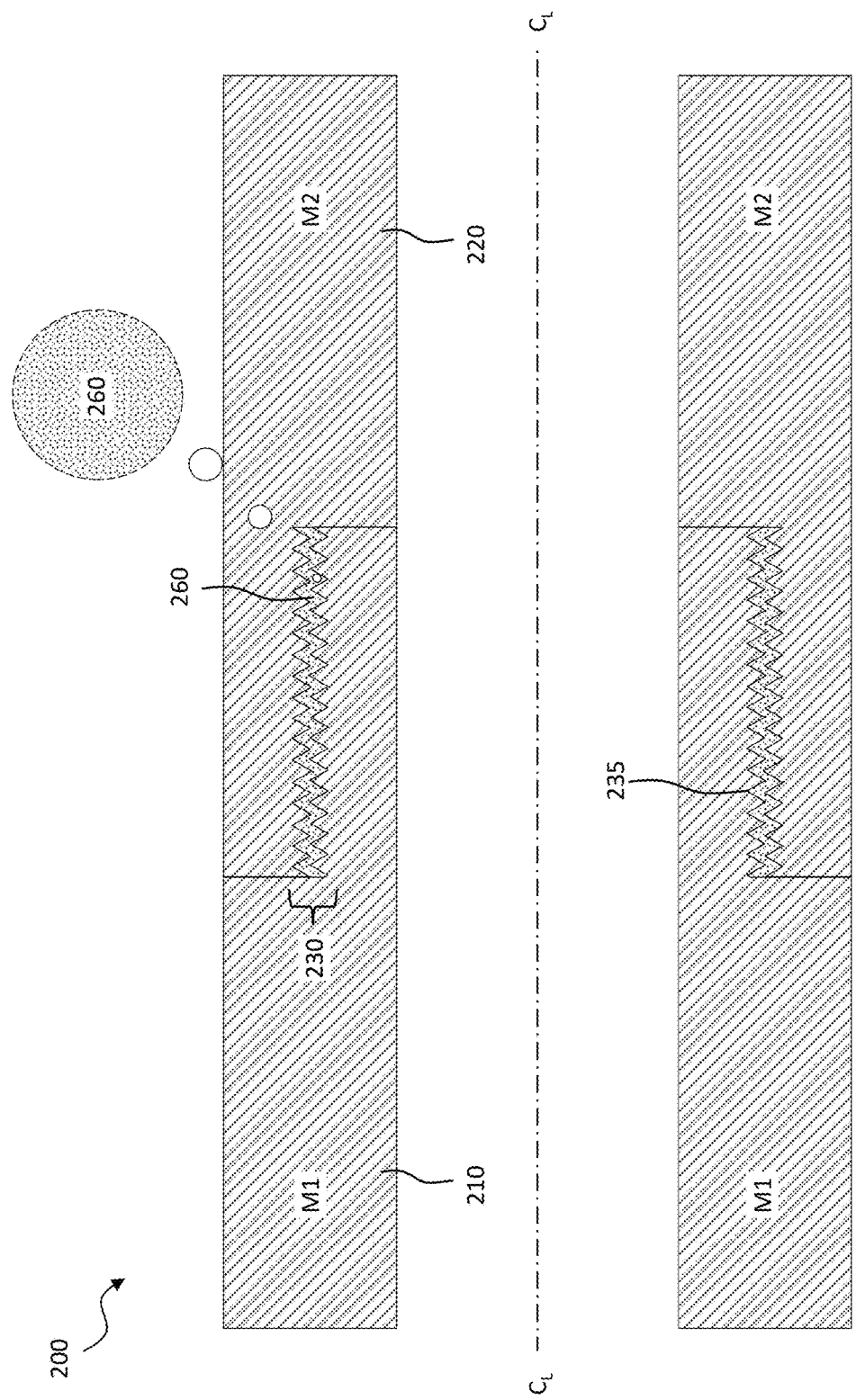

Turning to FIGS. 2A through 2C, depicted are various different manufacturing states for a junction 200 designed, manufactured and operated according to the disclosure. FIG. 2A illustrates the junction 200 pre-expansion, FIG. 2B illustrates the junction 200 post-expansion, and FIG. 2C illustrates the junction 200 post-expansion and containing residual unreacted expandable metal therein. The junction 200 of the embodiment of FIGS. 2A through 2C includes a first member 210 and second member 220. While not required, the first member 210 and the second member 220 may be a first tubular and a second tubular, such as is shown in the embodiment discussed with regard to FIGS. 2A through 2C. Accordingly, in at least one embodiment, the first member 210 and the second member 220 define a centerline ($C_L$). In other embodiments, however, one or both of the first member 210 or the second member 220 are not tubulars. In at least one embodiment, the second member 220 is a collet being coupled to the first member 210.

In accordance with one or more embodiments of the disclosure, the first member 210 comprises a first material (M1) and the second member 220 comprises a second material (M2). In certain embodiments, the first material (M1) and the second material (M2) are the same material, but in other embodiments the first material (M1) and the second material (M2) are different materials. In at least one embodiment, both the first material (M1) and the second material (M2) comprise metal, including steel in at least one embodiment.

In the illustrated embodiment, and in accordance with one embodiment of the disclosure, the first member 210 and the second member 220 overlap one another. Depending on the design, the overlap may be face-to-face, end-to-end, but-to-but, or any other overlap, as well as combinations of the same. The first member 210 and the second member 220, in the illustrated embodiment, thus define an overlapping space 230. The overlapping space 230, in at least one or more embodiments, helps define the type of junction. For example, in the embodiment of FIGS. 2A through 2C, the overlapping space 230 is a single step overlapping space, thereby forming a single step junction. Furthermore, as the first member 210 and the second member 220 include threads 235, a threaded junction is formed. In the illustrated embodiment, the threads 235 are straight threads, and thus the threaded junction is a non-premium threaded junction.

In the illustrated embodiment, the first member 210 has a first wall thickness ($t_1$) proximate the overlapping space 230 and the second member 220 has a second wall thickness ($t_2$) proximate the overlapping space 230. In accordance with at least one embodiment, the first wall thickness ($t_1$) and the second wall thickness ($t_2$) are no more than 45.0 cm. In accordance with at least one other embodiment, the first wall thickness ($t_1$) and the second wall thickness ($t_2$) are no more than 30.0 cm. Nevertheless, in yet at least one other embodiment, the first wall thickness ($t_1$) and the second wall thickness ($t_2$) are no more than 15 cm, or even no more than 5 cm. In at least one embodiment, the overlapping space has a thickness ($t_3$) that is a fraction of the first wall thickness ($t_1$) or the second wall thickness ($t_2$). For example, in at least one embodiment the thickness ($t_3$) is less than ⅓ the first wall thickness ($t_1$) or the second wall thickness ($t_2$). In yet another embodiment, the thickness ($t_3$) is less than ⅕ the first wall thickness ($t_1$) or the second wall thickness ($t_2$). In even yet another embodiment, the thickness ($t_3$) is less than 1/10 the first wall thickness ($t_1$) or the second wall thickness ($t_2$), or even less than 1/20 the first wall thickness ($t_1$) or the second wall thickness ($t_2$).

In the illustrated embodiment, the first member 210 has a length ($L_1$) and the second member 220 has a length ($L_2$). In at least one embodiment, the length ($L_1$) and the length ($L_2$) are at least 1 meter. In at least one other embodiment, the length ($L_1$) and the length ($L_2$) are at least 3 meters. In yet another embodiment, the length ($L_1$) and the length ($L_2$) range from 6 meters to 12 meters, or more. In the illustrated embodiment, at least a portion of the overlapping space 230 (and thus the resulting expanded metal junction) is parallel with the length ($L_1$) and/or length ($L_2$), thereby providing a set of straight threads. As will be discussed below, other embodiments exist wherein at least a portion of the overlapping space 230 (and thus the resulting expanded metal junction) is angled relative to the length ($L_1$) and/or length ($L_2$), thereby providing a set of tapered threads.

With reference to FIG. 2A, an expandable metal joint 240 is located at least partially within the overlapping space 230. The expandable metal joint 240, in accordance with one or more embodiments of the disclosure, comprises a metal configured to expand in response to hydrolysis. The expandable metal joint 240, in the illustrated embodiment, may comprise any of the expandable metals discussed above, or any combination of the same. Moreover, the expandable metal joint 240 may take any of the different shapes and/or configurations discussed above. Nevertheless, in the embodiment of FIG. 2A, the expandable metal joint is a thin sheet of expandable metal positioned between the threads 235 of the first member 210 and the second member 220. In certain embodiments, the thin sheet of expandable metal is malleable, and thus may take the form of the threads 235 when the first member 210 and the second member 220 are brought together.

The expandable metal joint 240 may have a variety of different lengths and thicknesses, for example depending on the amount of anchor, as well as whether it is desired for the expandable metal joint 240 to act as a seal when subjected to reactive fluid, and remain within the scope of the disclosure. In the embodiment of FIG. 2A, the expandable metal joint 240 separates almost an entirety of the threads 235 of the first member 210 and the second member 220. In other embodiments, however, the expandable metal joint 240 is only positioned between a lesser portion of the threads 235 of the first member 210 and the second member 220. In such an embodiment, the expandable metal joint 240 may be placed proximate a leakage source, distal a leakage source, or positioned at a middle point of the leakage source.

With reference to FIG. 2B, illustrated is the expandable metal joint 240 illustrated in FIG. 2A after subjecting it to a reactive fluid to expand the metal in the overlapping space 230, and thereby form an expanded metal joint 250. In the illustrated embodiment, the expanded metal joint 250 generally fills the overlapping space, as that term is defined above. In yet other embodiments, the expanded metal joint 250 substantially fills the overlapping space 230, as that term is defined above, or in yet other embodiments, the expanded metal joint 250 excessively fills the overlapping space 230, as that term is defined above, or entirely fills the overlapping space 230 in yet another embodiment.

Notwithstanding the foregoing, the expanded metal joint 250 may have a variety of different volumes and remain within the scope of the disclosure. Such volumes, as expected, are a function of the size of the overlapping space 230, the volume of the expandable metal joint 240, and the composition of the expandable metal joint 240, among other factors. Nevertheless, in at least one embodiment, the expanded metal joint 250 has a volume of no more than 25,000 $cm^3$. In yet another embodiment, the overlapping space has a volume of no more than 7,750 $cm^3$. In at least one other embodiment, the expanded metal joint 250 has a volume ranging from about 31.5 $mm^3$ to about 5,813 $cm^3$, and in yet another embodiment, the expanded metal joint 250 has a volume ranging from about 4,282 $mm^3$ to about 96,700 $mm^3$.

With reference to FIG. 2C, illustrated is the expandable metal joint 240 illustrated in FIG. 2A after subjecting it to a reactive fluid to expand the metal in the overlapping space 230, and thereby form an expanded metal junction 260 including residual unreacted expandable metal therein. In one embodiment, the expanded metal junction 260 includes at least 1% residual unreacted expandable metal therein. In yet another embodiment, the expanded metal junction 260 includes at least 3% residual unreacted expandable metal therein. In even yet another embodiment, the expanded metal junction 260 includes at least 10% residual unreacted expandable metal therein, and in certain embodiments at least 20% residual unreacted expandable metal therein.

Figure 3A:
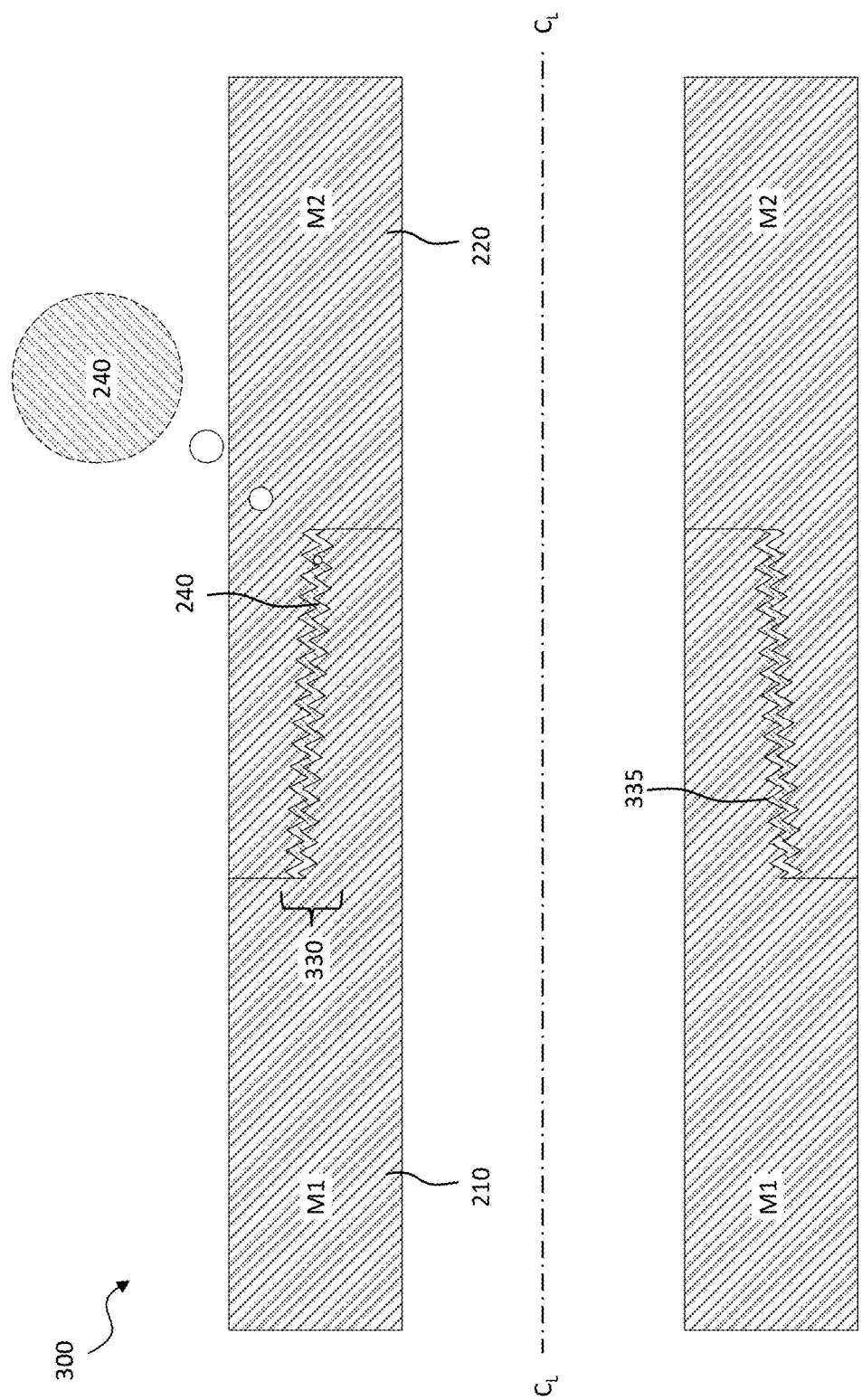
FIGS. 3A through 3C illustrate an alternative embodiment of a junction designed, manufactured and operated according to one embodiment of the disclosure.
Figure 3B:
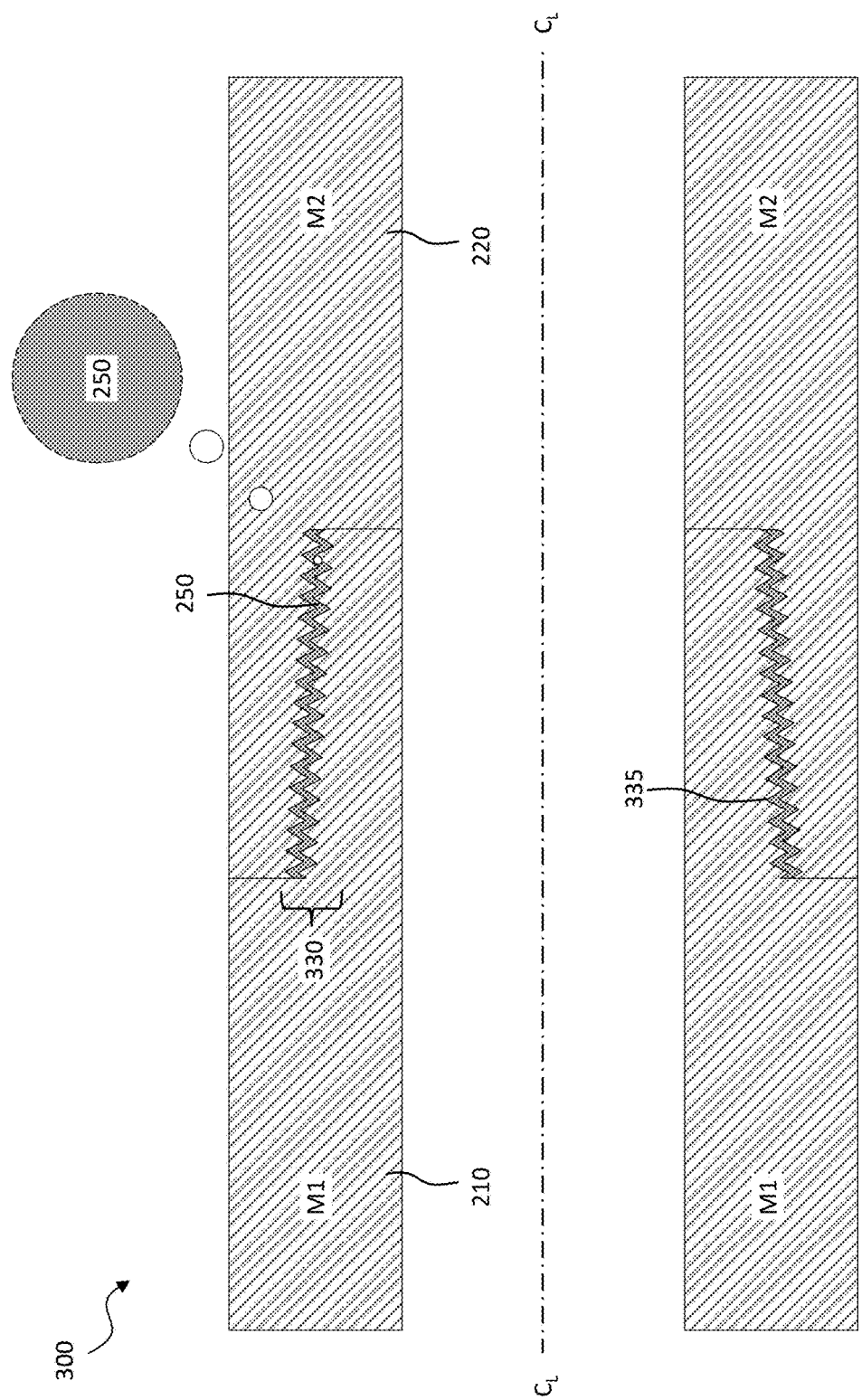
Figure 3C:
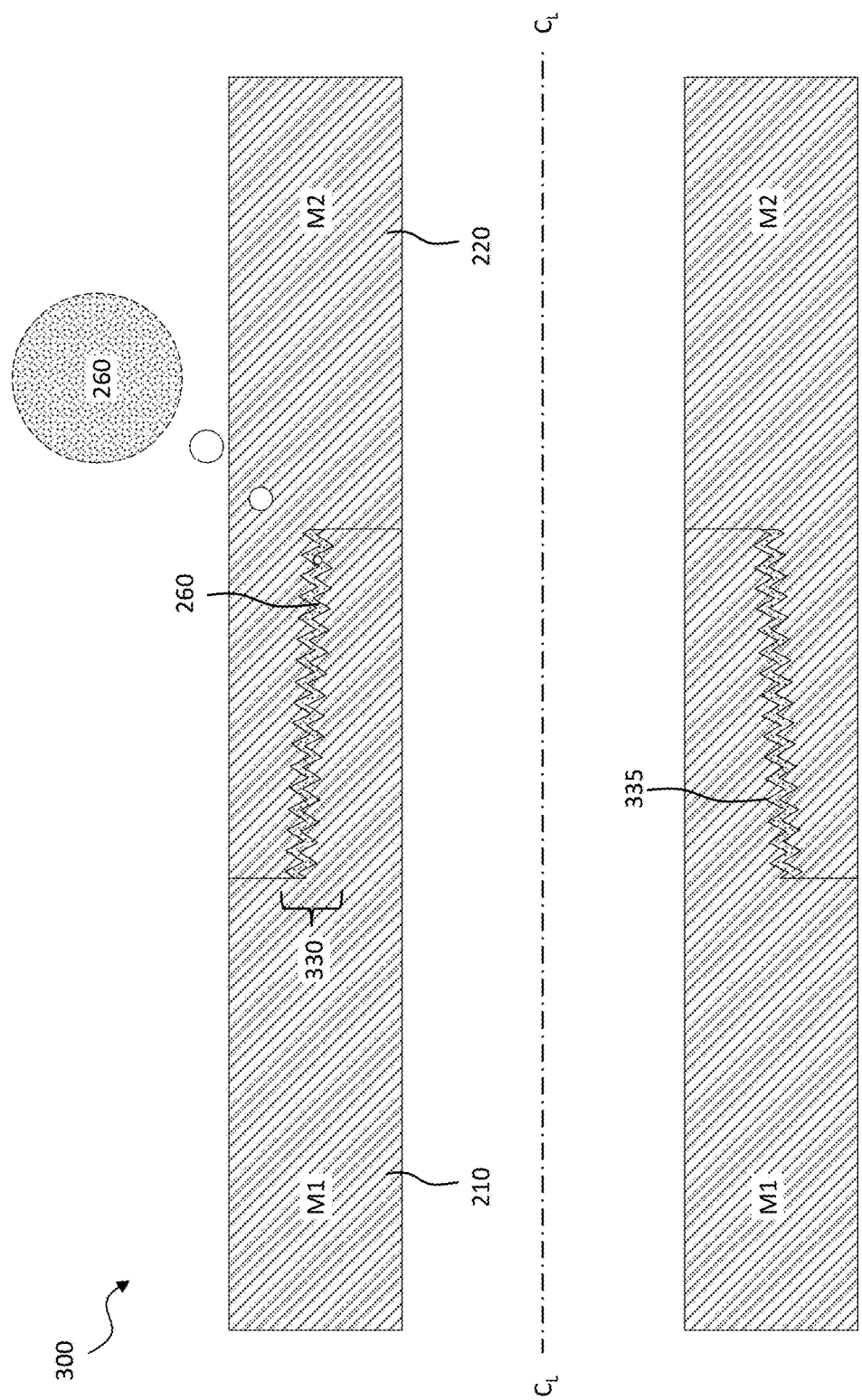

Turning now to FIGS. 3A through 3C, depicted are various different manufacturing states for a junction 300 designed, manufactured and operated according to an alternative embodiment of the disclosure. FIG. 3A illustrates the junction 300 pre-expansion, FIG. 3B illustrates the junction 300 post-expansion, and FIG. 3C illustrates the junction 300 post-expansion and containing residual unreacted expandable metal therein. The junction 300 of FIGS. 3A through 3C is similar in many respects to the junction 200 of FIGS. 2A through 2C. Accordingly, like reference numbers have been used to illustrate similar, if not identical, features. The junction 300 differs, for the most part, from the junction 200, in that at least a portion of the overlapping space 330 (and thus the resulting expanded metal junction) is angled relative to the length ($L_1$) and/or length ($L_2$), thereby providing a set of tapered threads. Accordingly, the junction 300 of FIGS. 3A through 3C is configured as a premium threaded junction.

Figure 4A:
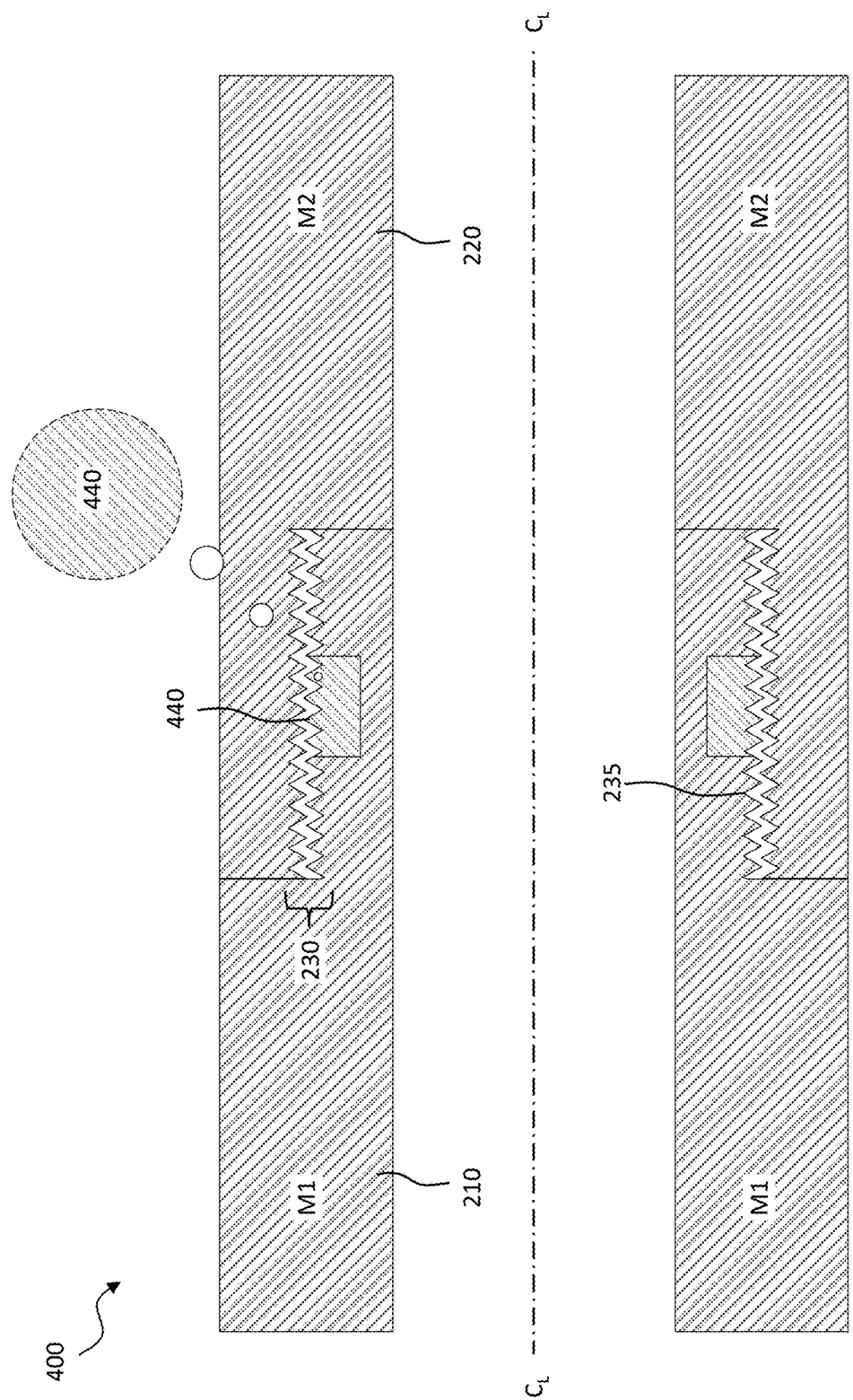
FIGS. 4A through 4C illustrate an alternative embodiment of a junction designed, manufactured and operated according to one embodiment of the disclosure.
Figure 4B:
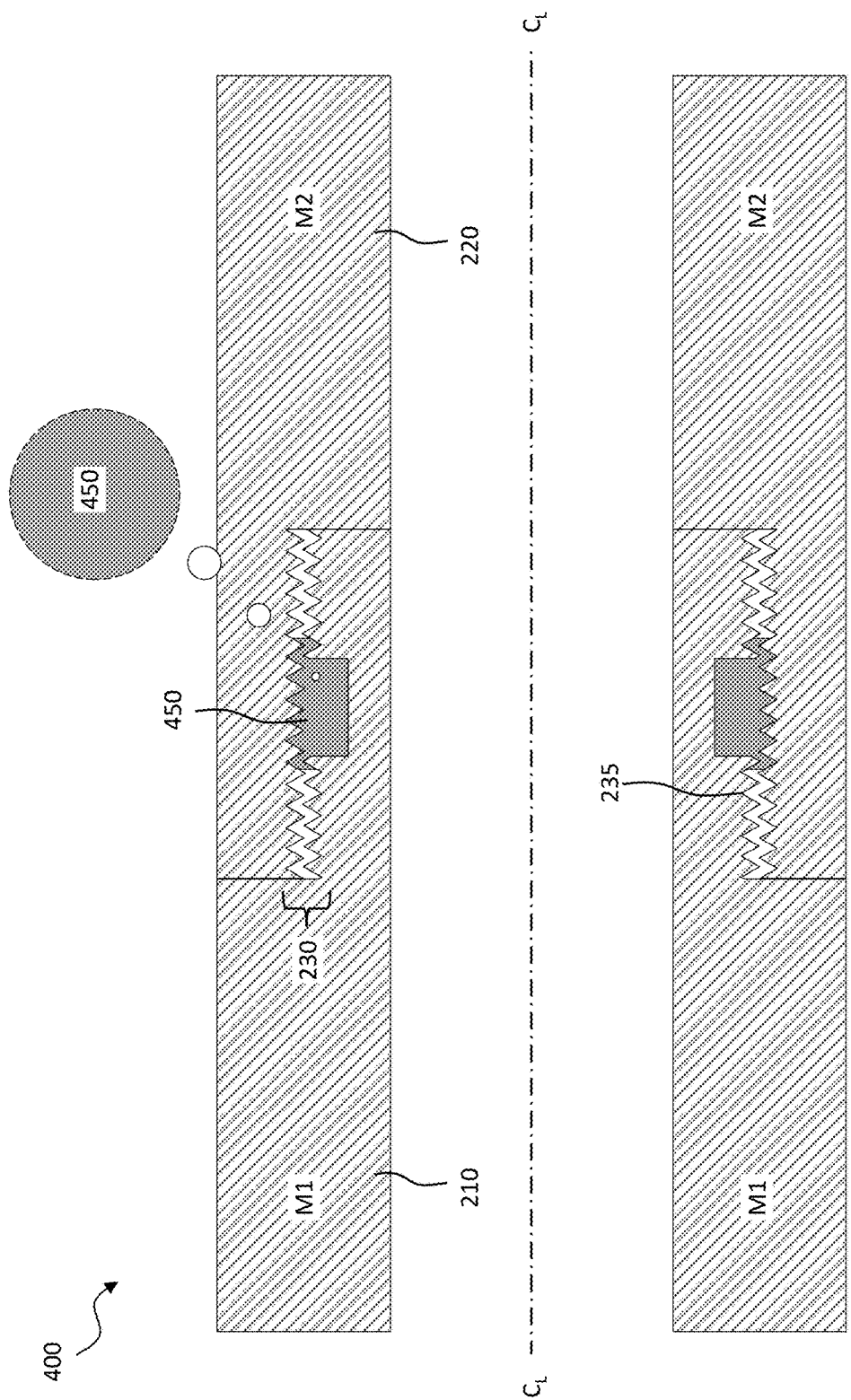
Figure 4C:
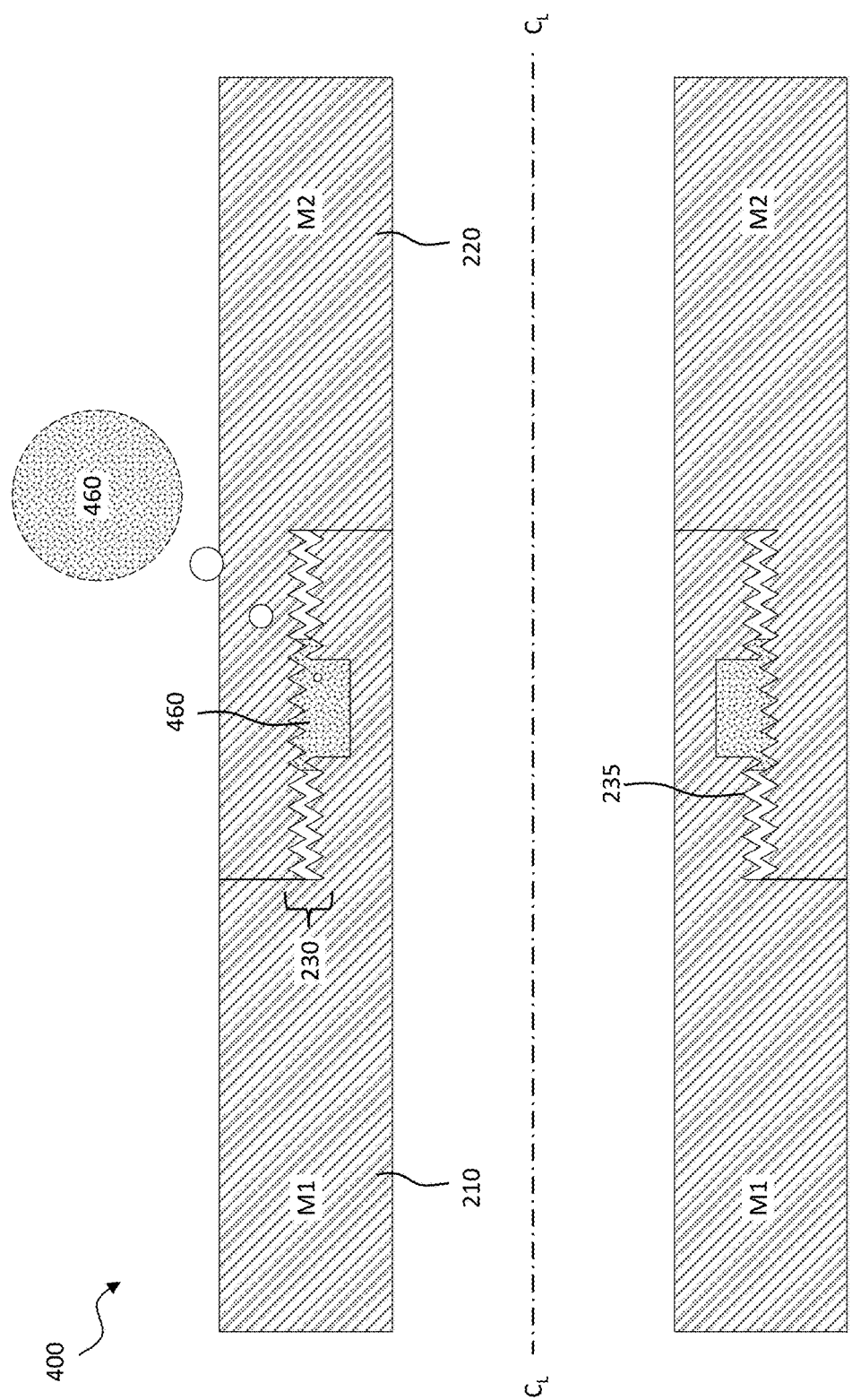

Turning now to FIGS. 4A through 4C, depicted are various different manufacturing states for a junction 400 designed, manufactured and operated according to an alternative embodiment of the disclosure. FIG. 4A illustrates the junction 400 pre-expansion, FIG. 4B illustrates the junction 400 post-expansion, and FIG. 4C illustrates the junction 400 post-expansion and containing residual unreacted expandable metal therein. The junction 400 of FIGS. 4A through 4C is similar in many respects to the junction 200 of FIGS. 2A through 2C. Accordingly, like reference numbers have been used to illustrate similar, if not identical, features. The junction 400 differs, for the most part, from the junction 200, in that the expandable metal joint 440 is an expandable metal threaded insert. For example, a portion of one or both of the first member 210 or the second member 220 could be modified, whether in the manufacturing process or thereafter (e.g., by cutting a gland therein), such that the expandable metal threaded insert could be placed at least partially in the overlapping space 230 (e.g., within the gland). The expandable metal joint 440 would, when subjected to the reactive fluid, expand in much the same way as the expandable metal joint 240. Accordingly, what results is an expanded metal joint 450 (FIG. 4B), and/or expanded metal joint 460 including residual unreacted expandable metal therein (FIG. 4C).

Figure 5A:
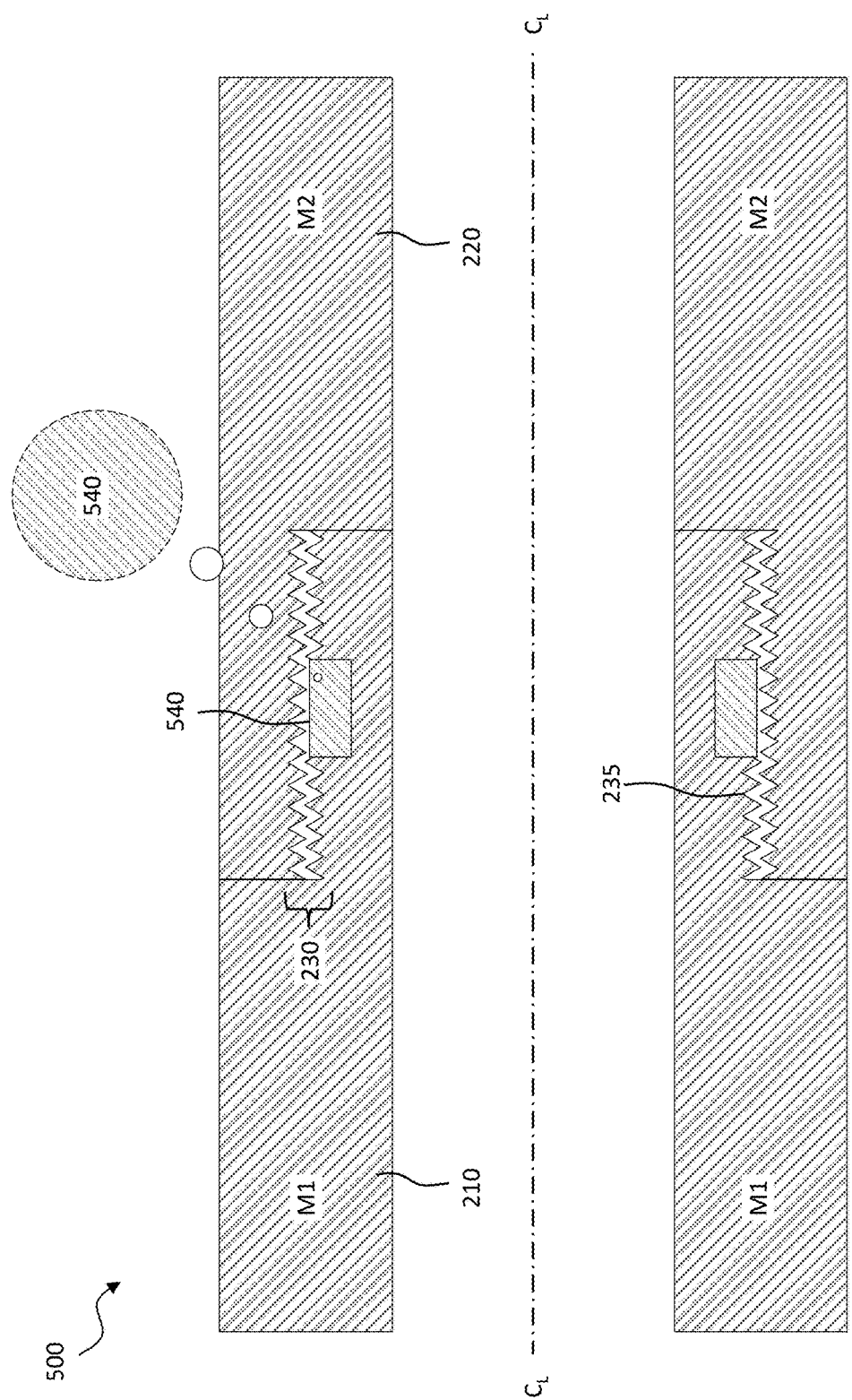
FIGS. 5A through 5C illustrate an alternative embodiment of a junction designed, manufactured and operated according to one embodiment of the disclosure.
Figure 5B:
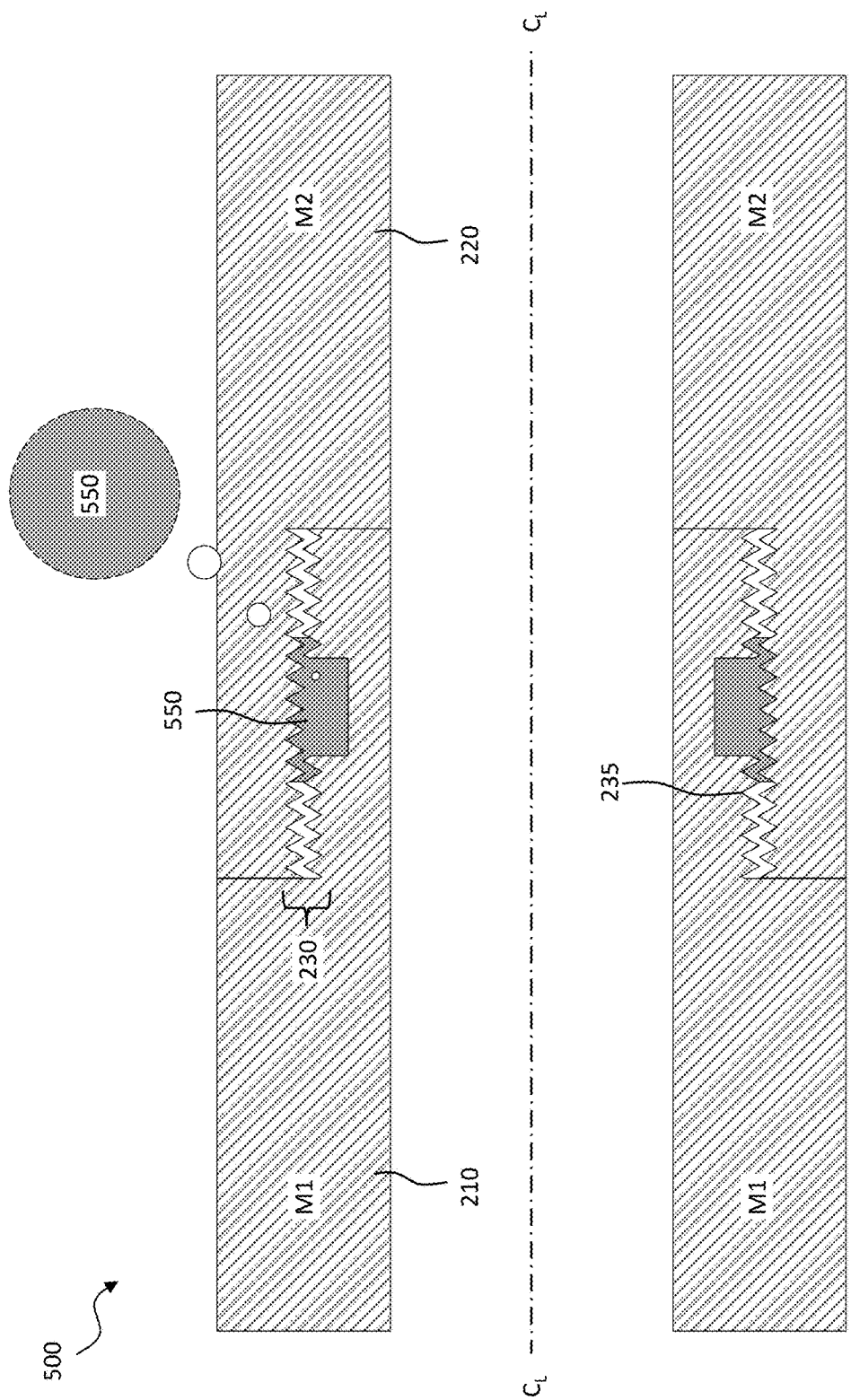
Figure 5C:
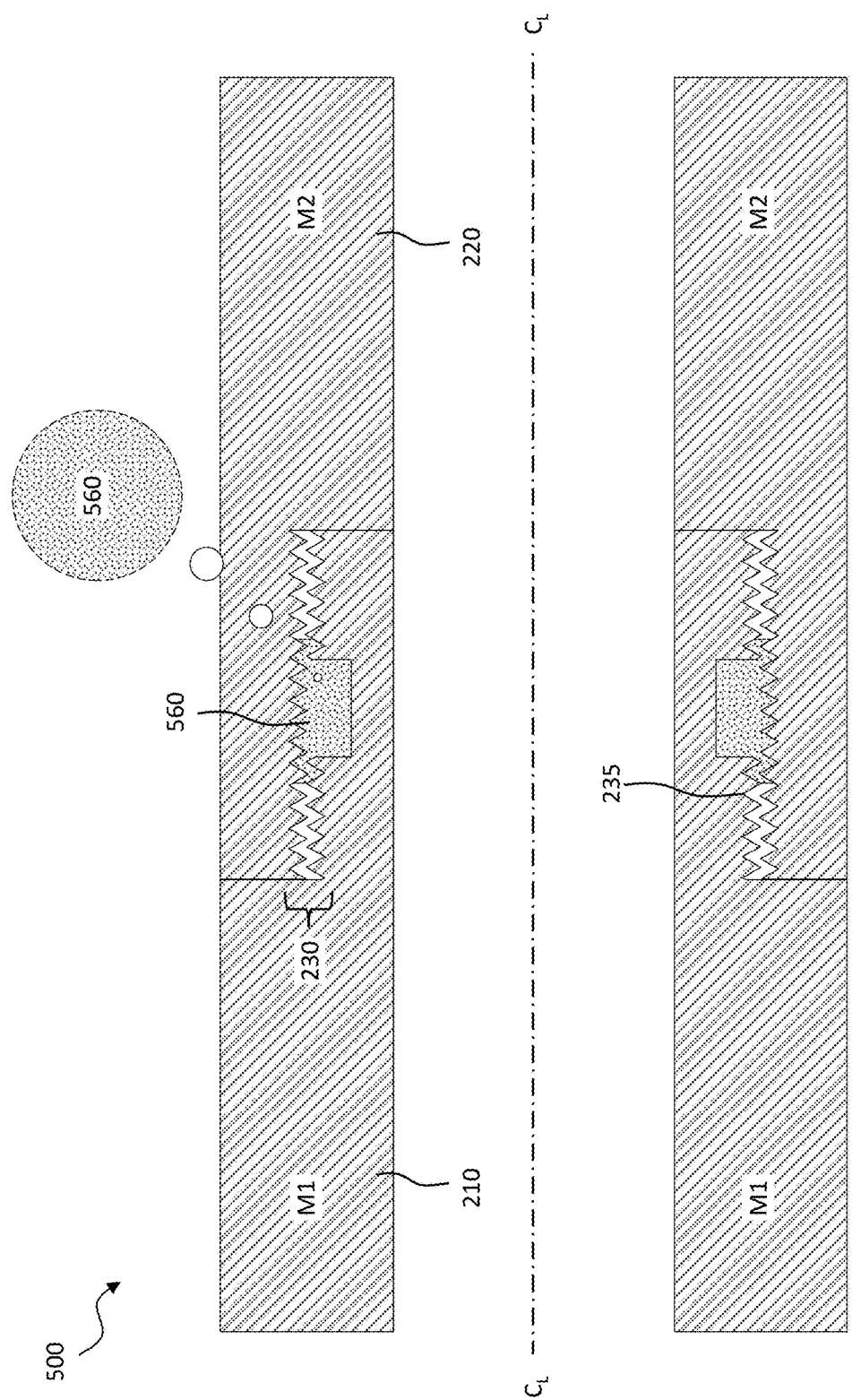

Turning now to FIGS. 5A through 5C, depicted are various different manufacturing states for a junction 500 designed, manufactured and operated according to an alternative embodiment of the disclosure. FIG. 5A illustrates the junction 500 pre-expansion, FIG. 5B illustrates the junction 500 post-expansion, and FIG. 5C illustrates the junction 500 post-expansion and containing residual unreacted expandable metal therein. The junction 500 of FIGS. 5A through 5C is similar in many respects to the junction 200 of FIGS. 2A through 2C. Accordingly, like reference numbers have been used to illustrate similar, if not identical, features. The junction 500 differs, for the most part, from the junction 200, in that the expandable metal joint 540 is an expandable metal non-threaded insert. For example, a portion of one or both of the first member 210 or the second member 220 could be modified, whether in the manufacturing process or thereafter (e.g., by cutting a gland therein), such that the expandable metal non-threaded insert could be placed at least partially in the overlapping space 230 (e.g., within the gland). The expandable metal joint 540 would, when subjected to the reactive fluid, expand in much the same way as the expandable metal joint 240. Accordingly, what results is an expanded metal joint 550 (FIG. 5B), and/or expanded metal joint 560 including residual unreacted expandable metal therein (FIG. 5C).

Figure 6A:
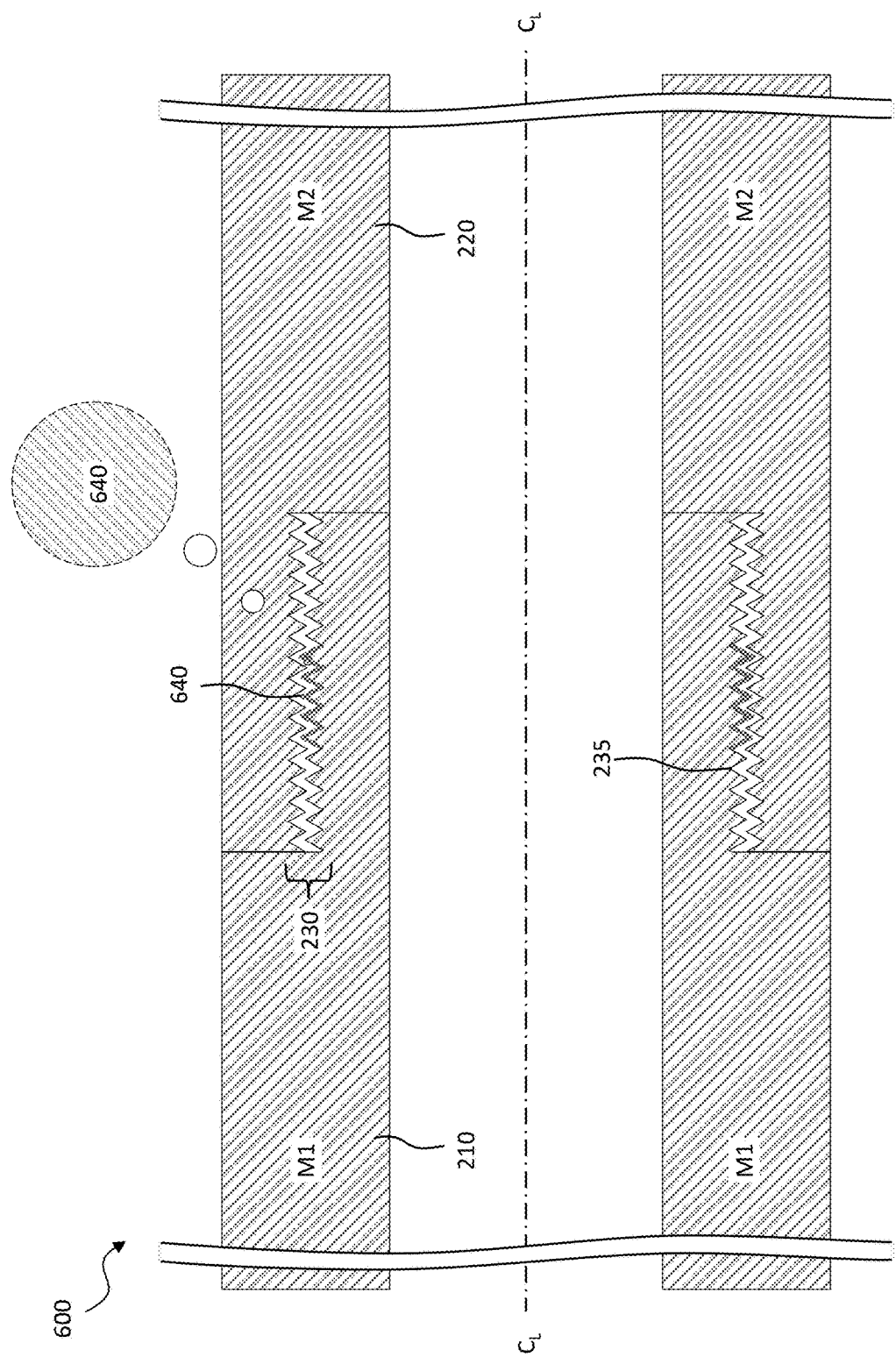
FIGS. 6A through 6C illustrate an alternative embodiment of a junction designed, manufactured and operated according to one embodiment of the disclosure.
Figure 6B:
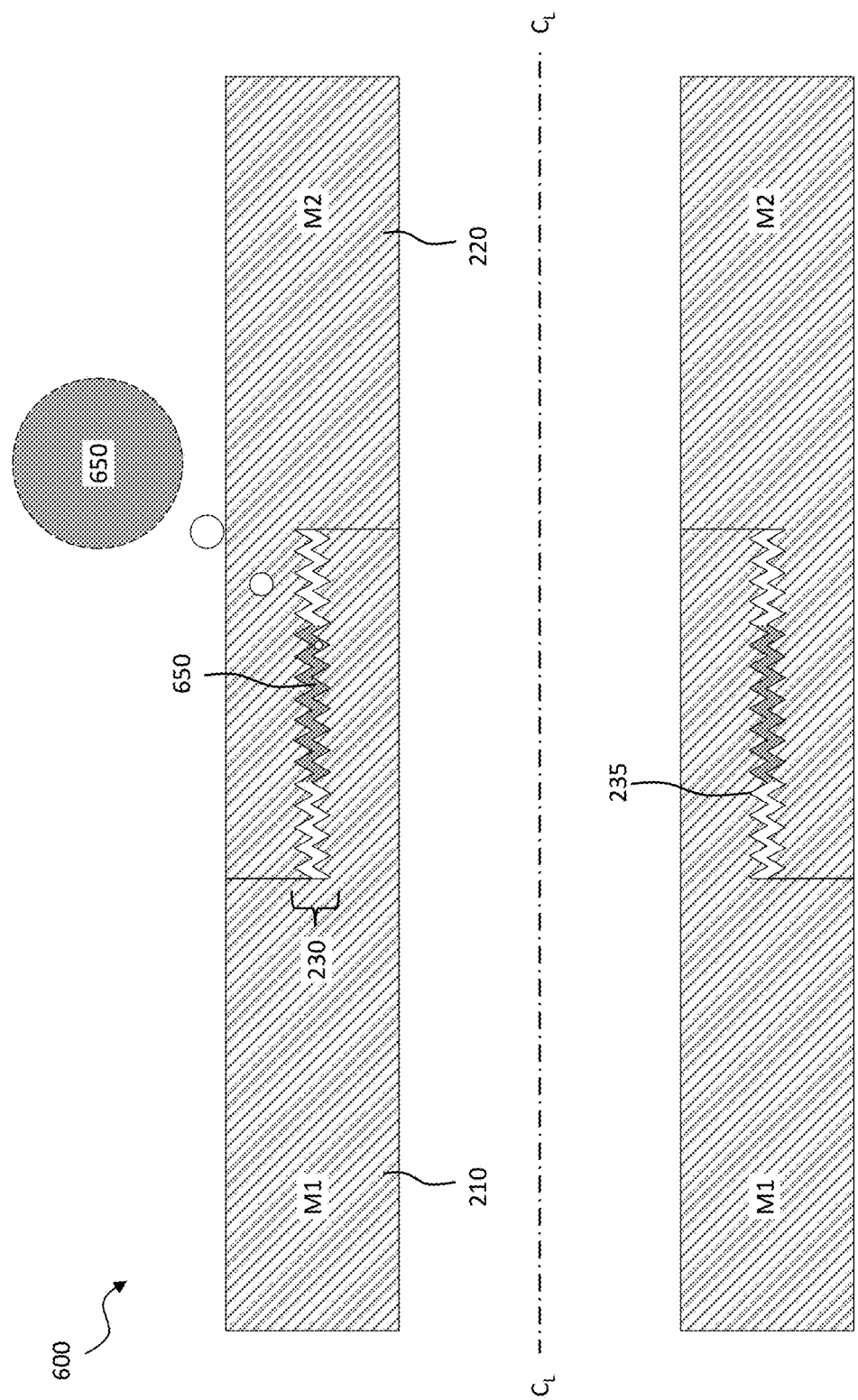
Figure 6C:
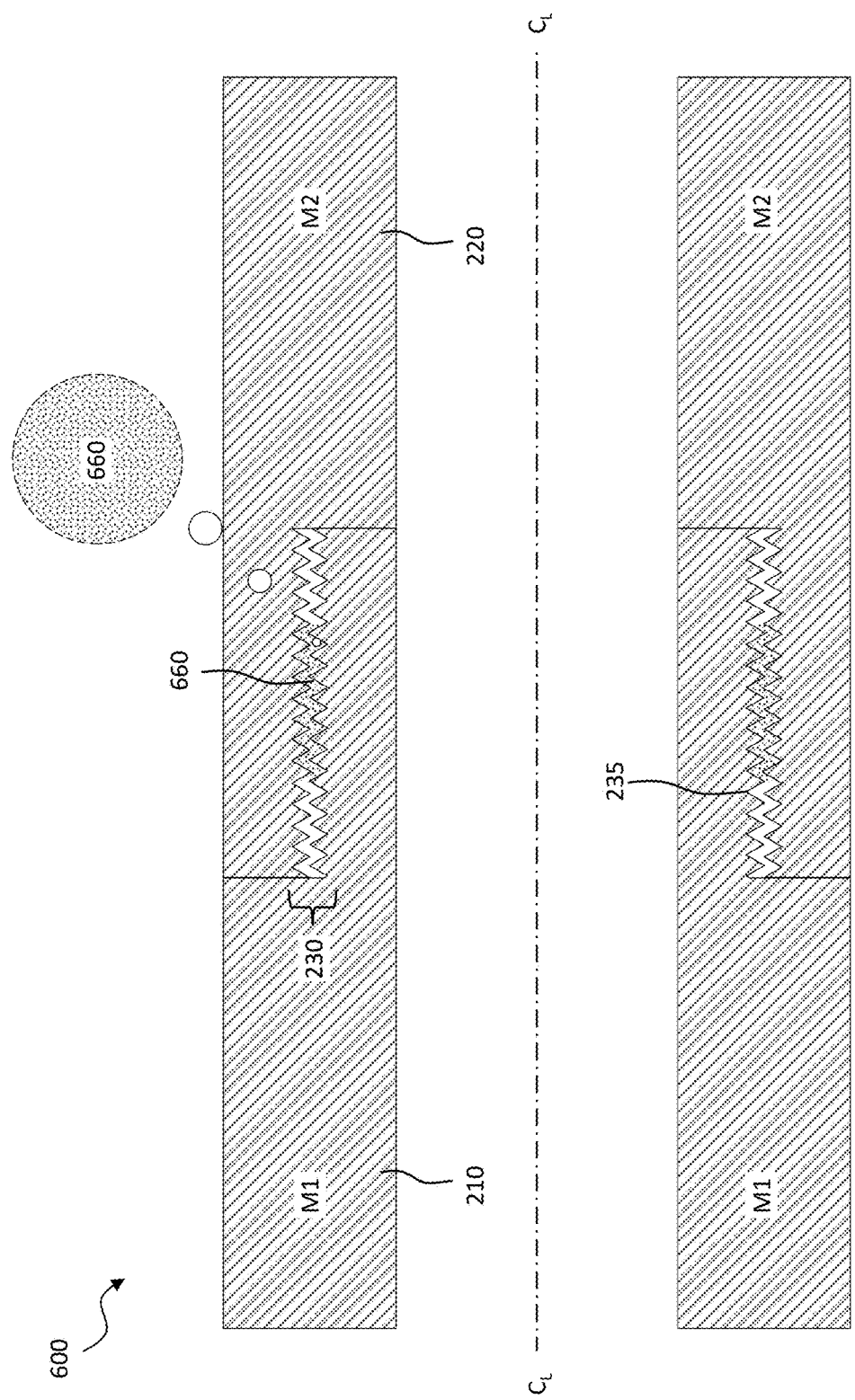

Turning now to FIGS. 6A through 6C, depicted are various different manufacturing states for a junction 600 designed, manufactured and operated according to an alternative embodiment of the disclosure. FIG. 6A illustrates the junction 600 pre-expansion, FIG. 6B illustrates the junction 600 post-expansion, and FIG. 6C illustrates the junction 600 post-expansion and containing residual unreacted expandable metal therein. The junction 600 of FIGS. 6A through 6C is similar in many respects to the junction 200 of FIGS. 2A through 2C. Accordingly, like reference numbers have been used to illustrate similar, if not identical, features. The junction 600 differs, for the most part, from the junction 200, in that the expandable metal joint 640 is a deposited expandable metal joint that has been deposited on one more or more of the surfaces of the first member 210 or the second member 220 (e.g., deposited on the threads 235 of the first member 210 or the second member 220). The expandable metal joint 640 may be deposited using any of the aforementioned methods, as well as methods learned at a later point in time. The expandable metal joint 640 would, when subjected to the reactive fluid, expand in much the same way as the expandable metal joint 240. Accordingly, what results is an expanded metal joint 650 (FIG. 6B), and/or expanded metal joint 660 including residual unreacted expandable metal therein (FIG. 6C).

Figure 7A:
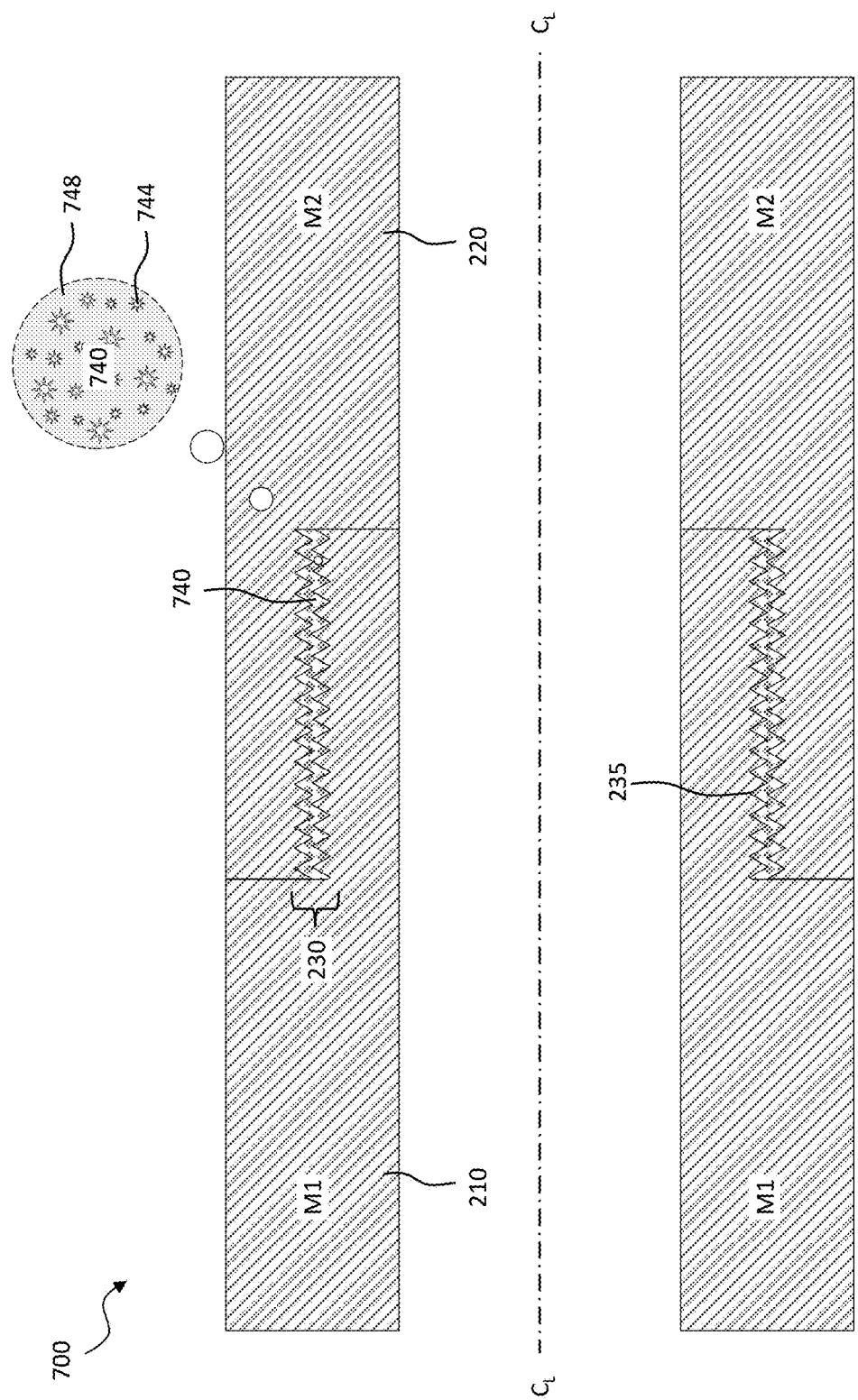
FIGS. 7A through 7C illustrate an alternative embodiment of a junction designed, manufactured and operated according to one embodiment of the disclosure.
Figure 7B:
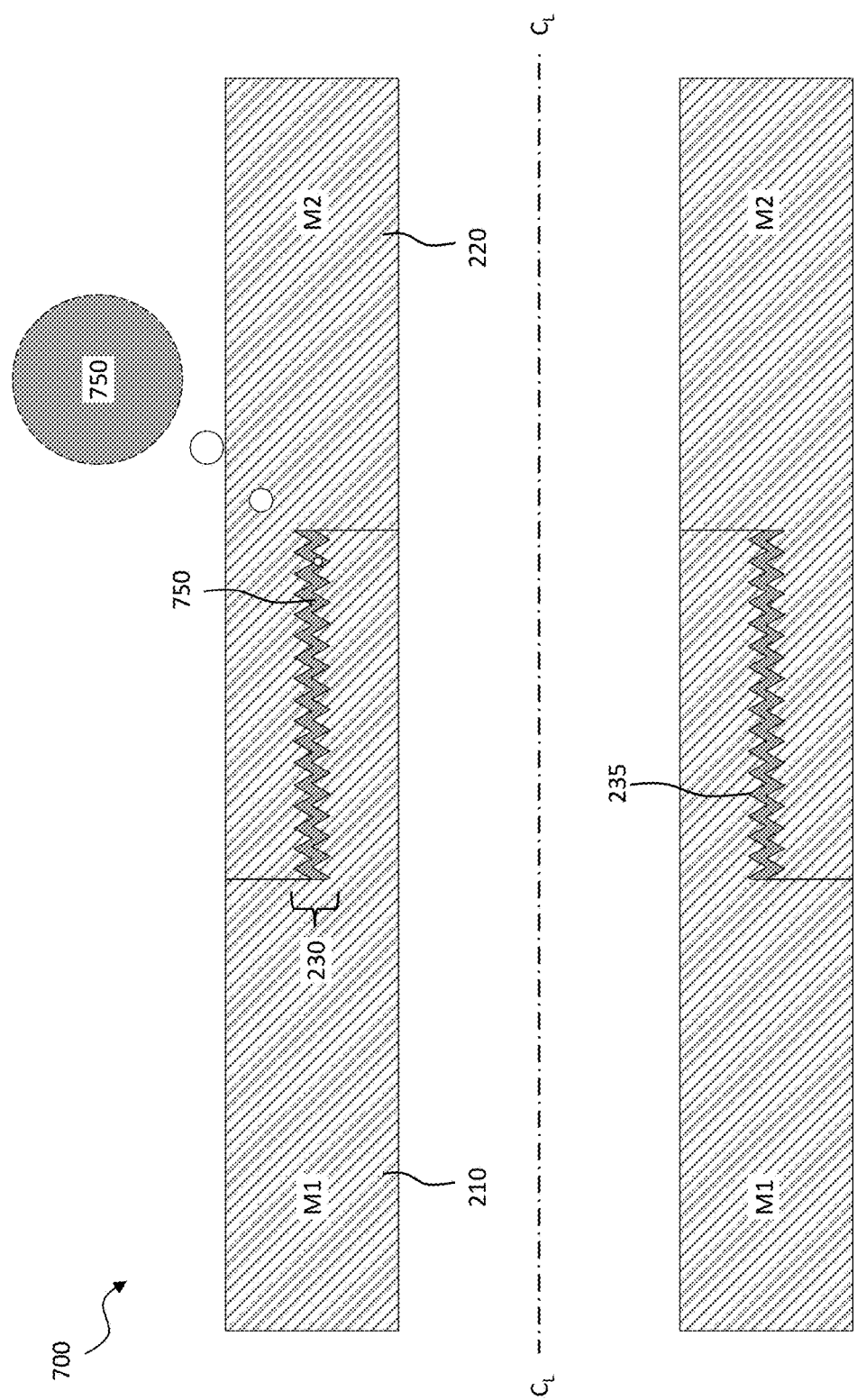
Figure 7C:
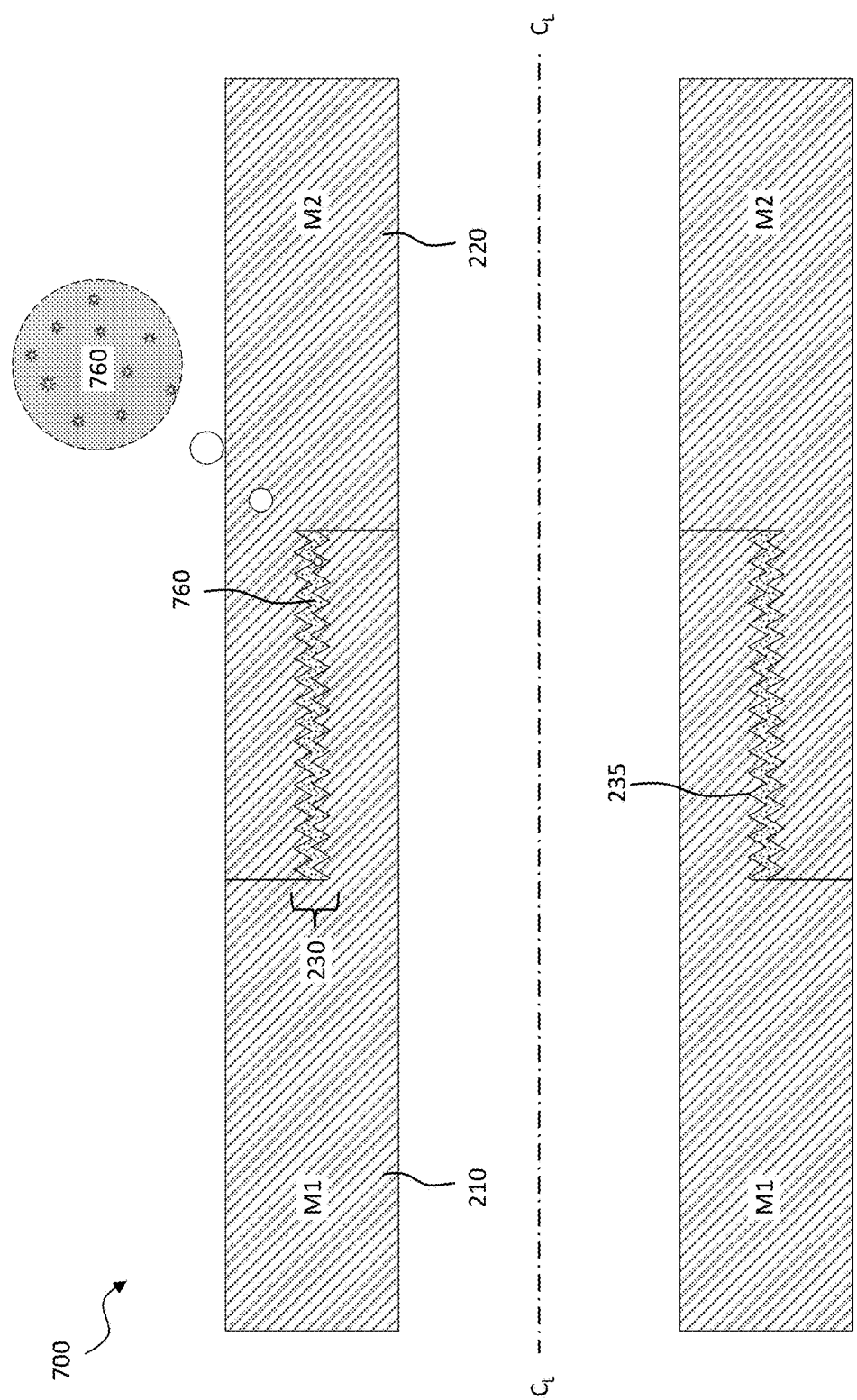

Turning now to FIGS. 7A through 7C, depicted are various different manufacturing states for a junction 700 designed, manufactured and operated according to an alternative embodiment of the disclosure. FIG. 7A illustrates the junction 700 pre-expansion, FIG. 7B illustrates the junction 700 post-expansion, and FIG. 7C illustrates the junction 700 post-expansion and containing residual unreacted expandable metal therein. The junction 700 of FIGS. 7A through 7C is similar in many respects to the junction 200 of FIGS. 2A through 2C. Accordingly, like reference numbers have been used to illustrate similar, if not identical, features. The junction 700 differs, for the most part, from the junction 200, in that the expandable metal joint 740 comprises a collection of individual separate chunks of the metal 744 held together with a carrier and/or binding agent 748. The collection of individual separate chunks of the metal 744 held together with a carrier and/or binding agent 748 may comprise any of the materials discussed above. The expandable metal joint 740 would, when subjected to the reactive fluid, expand in much the same way as the expandable metal joint 240. Accordingly, what results is an expanded metal joint 750 (FIG. 7B), and/or expanded metal joint 760 including residual unreacted expandable metal therein (FIG. 7C).

Figure 8A:
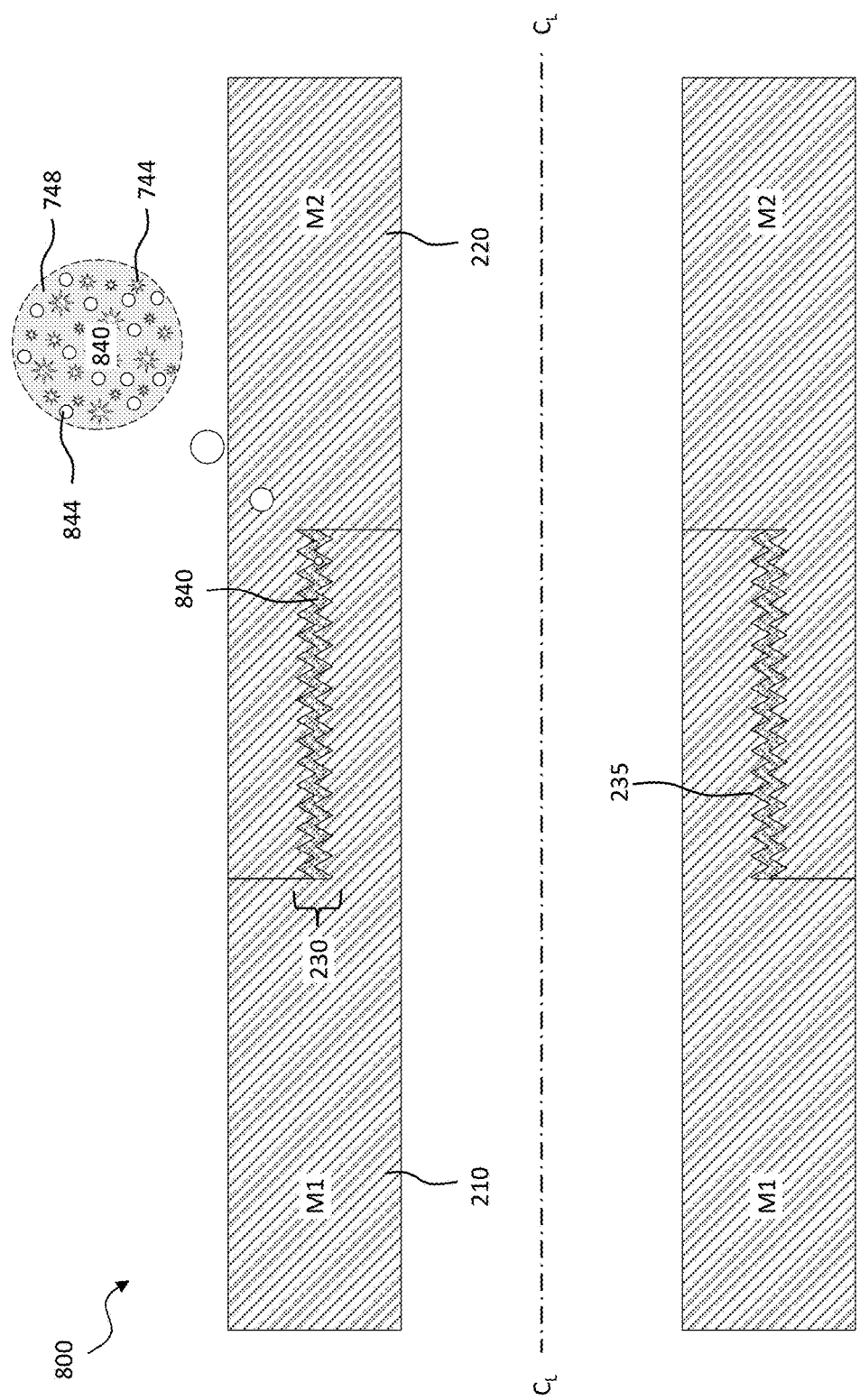
Figure 8C:
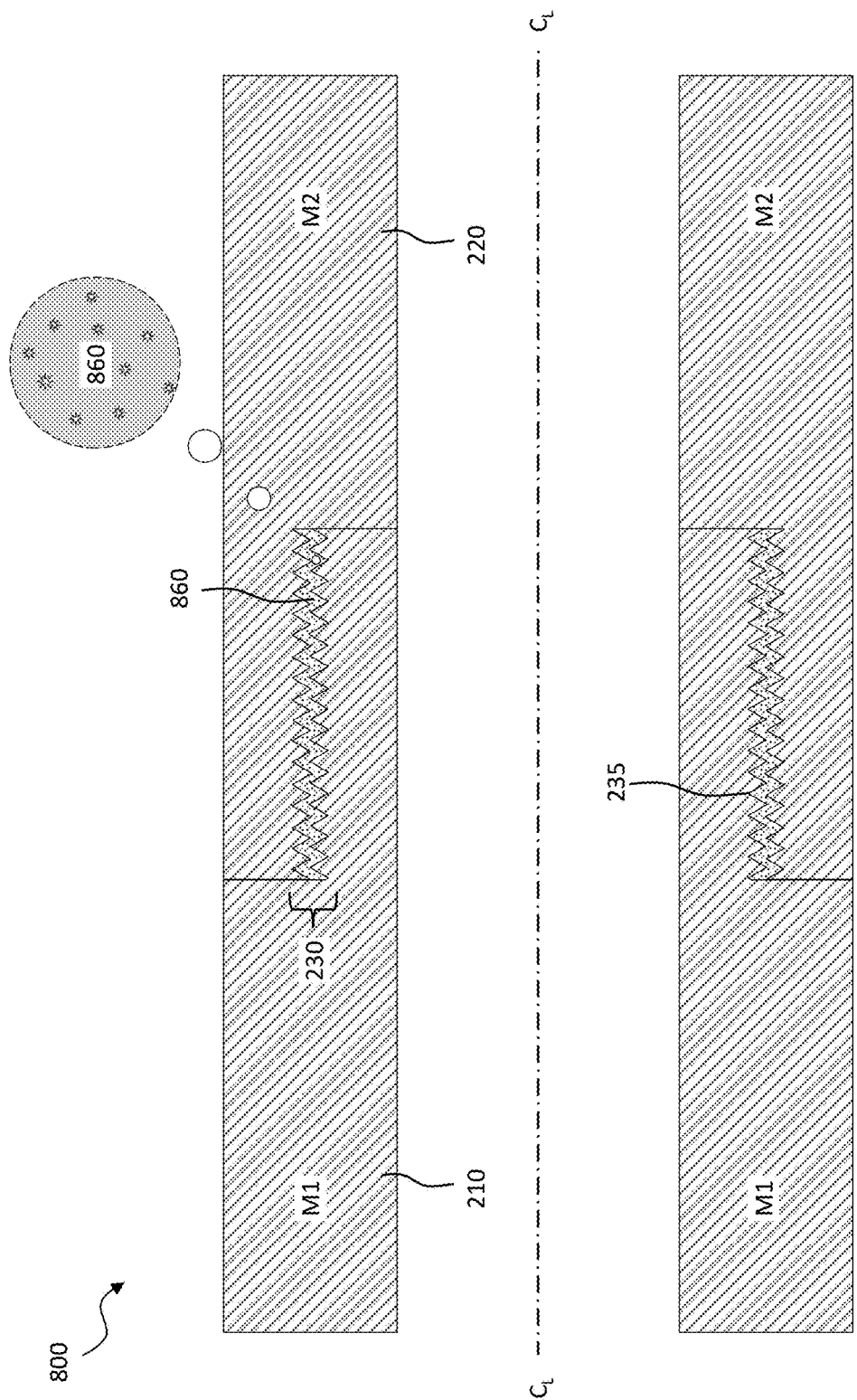

Turning now to FIGS. 8A through 8C, depicted are various different manufacturing states for a junction 800 designed, manufactured and operated according to an alternative embodiment of the disclosure. FIG. 8A illustrates the junction 800 pre-expansion, FIG. 8B illustrates the junction 800 post-expansion, and FIG. 8C illustrates the junction 800 post-expansion and containing residual unreacted expandable metal therein. The junction 800 of FIGS. 8A through 8C is similar in many respects to the junction 700 of FIGS. 7A through 7C. Accordingly, like reference numbers have been used to illustrate similar, if not identical, features. The junction 800 differs, for the most part, from the junction 700, in that the expandable metal joint 840 additionally includes a plurality of microspheres of encapsulated reactive fluid

844. The plurality of microspheres of encapsulated reactive fluid 844 may comprise any of the microspheres of encapsulated reactive fluid discussed above. The expandable metal joint 840 would, when subjected to the reactive fluid, expand in much the same way as the expandable metal joint 740. Accordingly, what results is an expanded metal joint 850 (FIG. 8B), and/or expanded metal joint 860 including residual unreacted expandable metal therein (FIG. 8C).

Figure 9A:
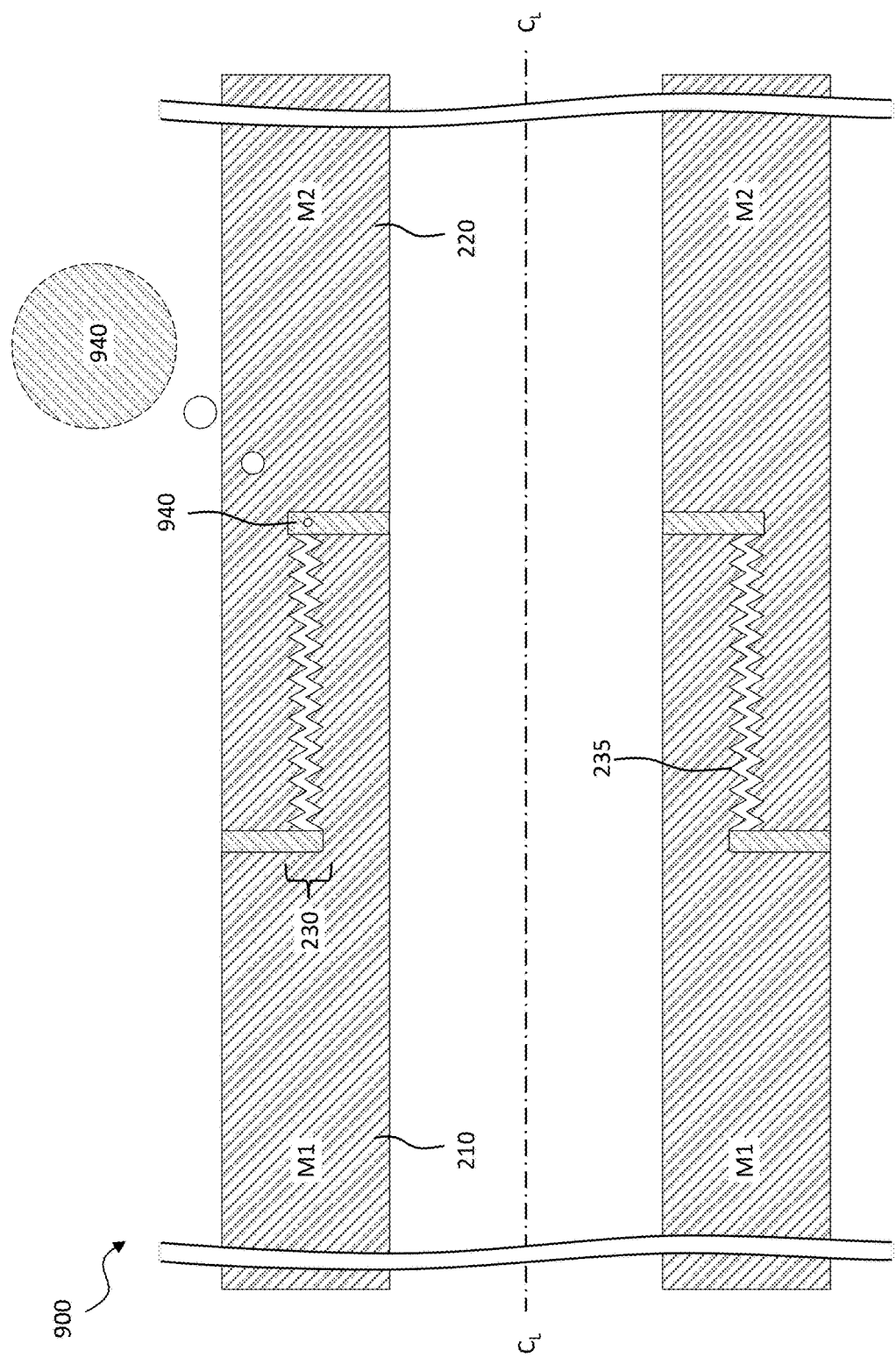
FIGS. 9A through 9C illustrate an alternative embodiment of a junction designed, manufactured and operated according to one embodiment of the disclosure.
Figure 9B:
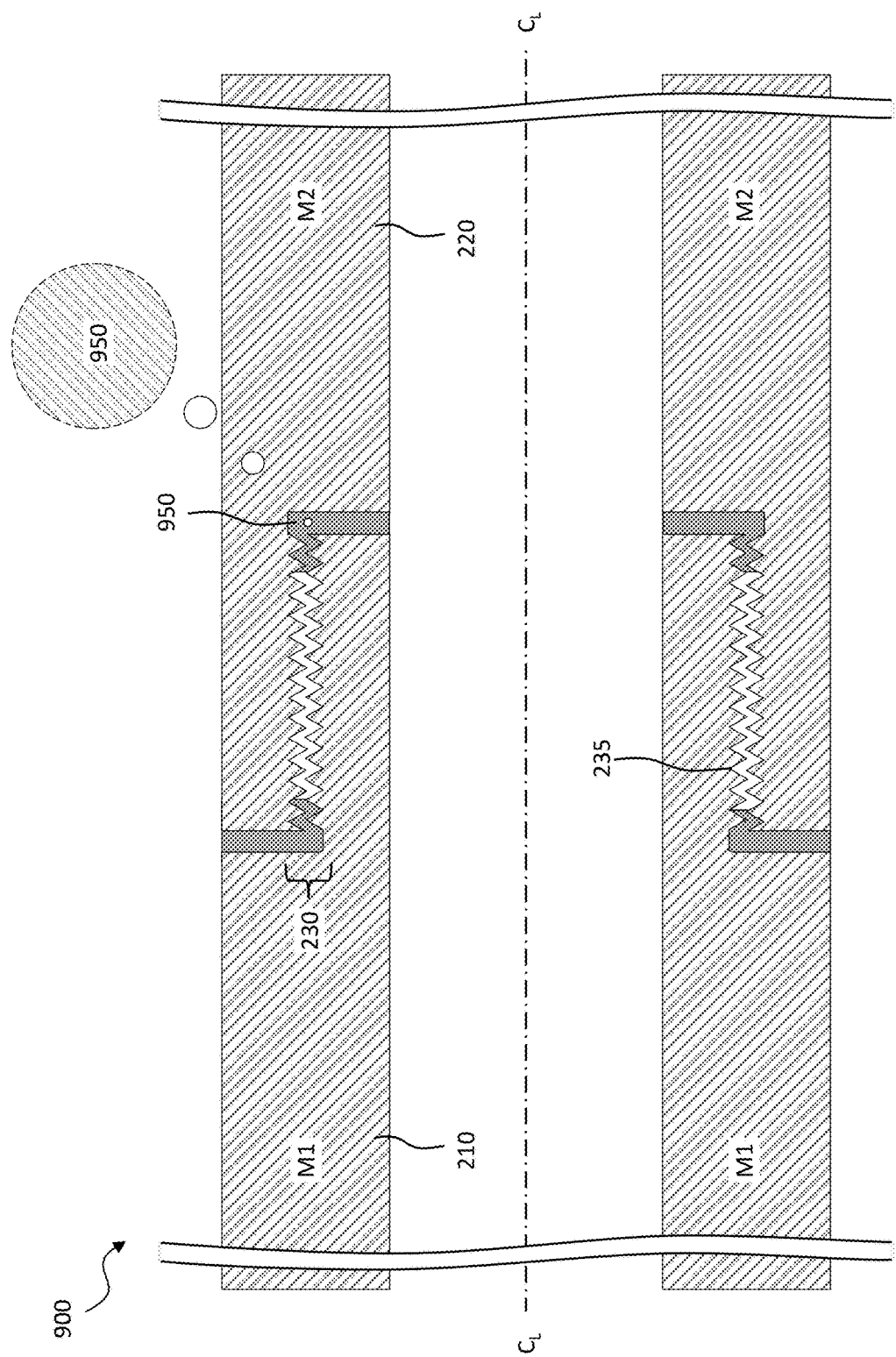
Figure 9C:
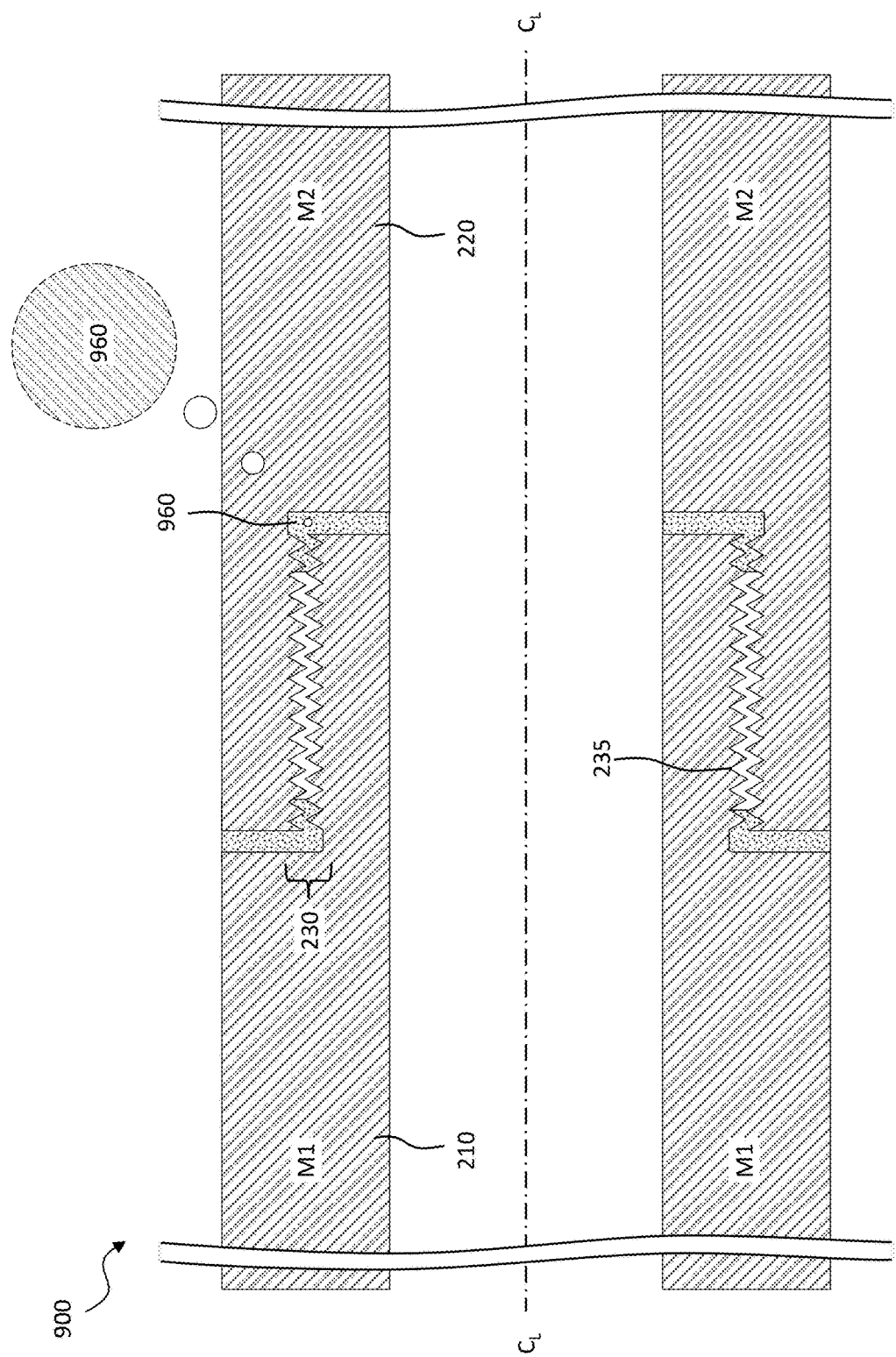

Turning now to FIGS. 9A through 9C, depicted are various different manufacturing states for a junction 900 designed, manufactured and operated according to an alternative embodiment of the disclosure. FIG. 9A illustrates the junction 900 pre-expansion, FIG. 9B illustrates the junction 900 post-expansion, and FIG. 9C illustrates the junction 900 post-expansion and containing residual unreacted expandable metal therein. The junction 900 of FIGS. 9A through 9C is similar in many respects to the junction 200 of FIGS. 2A through 2C. Accordingly, like reference numbers have been used to illustrate similar, if not identical, features. The junction 900 differs, for the most part, from the junction 200, in that the expandable metal joint 940 is positioned at an end face (e.g., one or more end faces) where the first member 210 and the second member 220 engage one another. The expandable metal joint 940 would, when subjected to the reactive fluid, expand in much the same way as the expandable metal joint 240. Accordingly, what results is an expanded metal joint 950 (FIG. 9B), and/or expanded metal joint 960 including residual unreacted expandable metal therein (FIG. 9C).

Figure 10A:
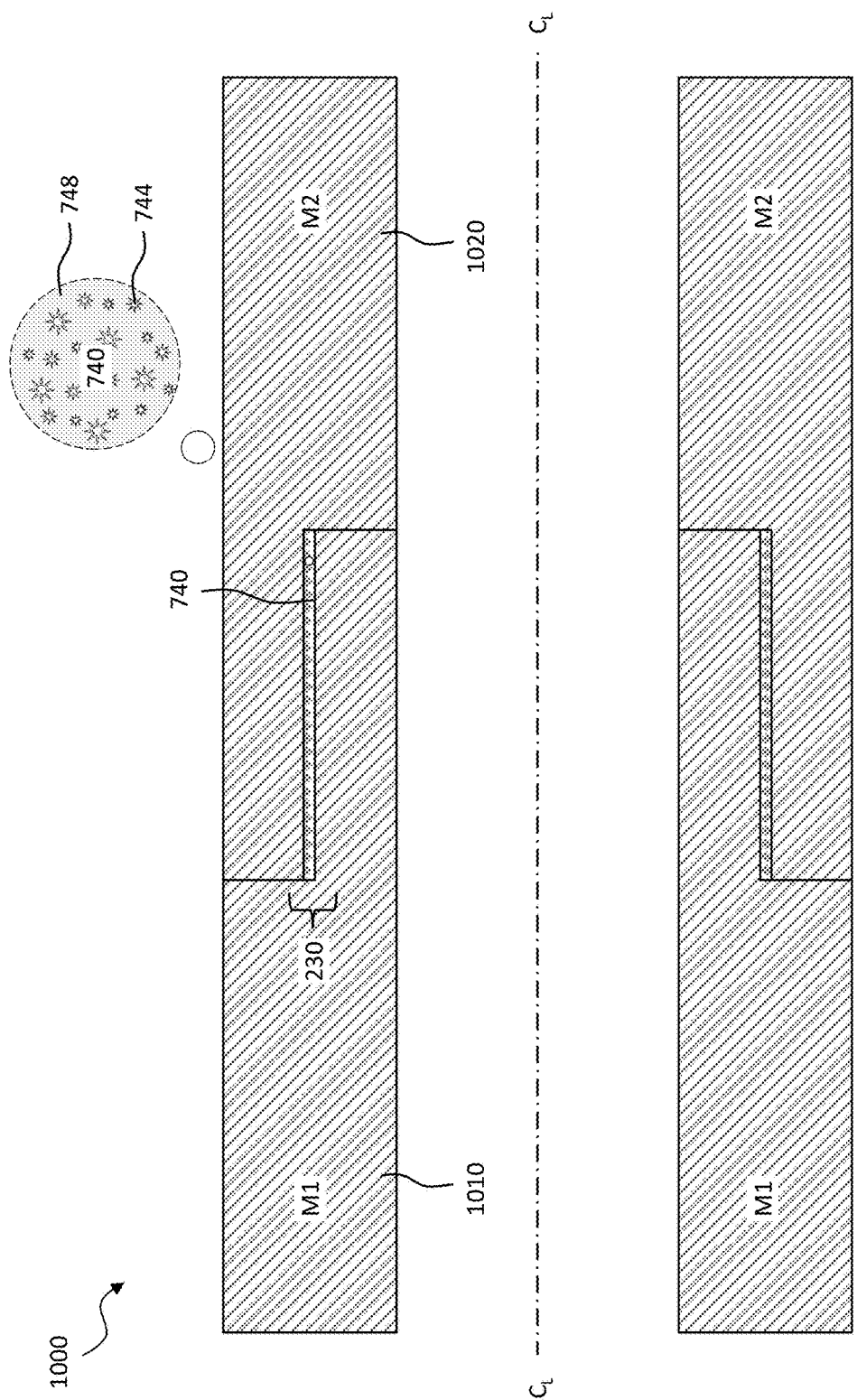
FIGS. 10A through 10C illustrate an alternative embodiment of a junction designed, manufactured and operated according to one embodiment of the disclosure.
Figure 10B:
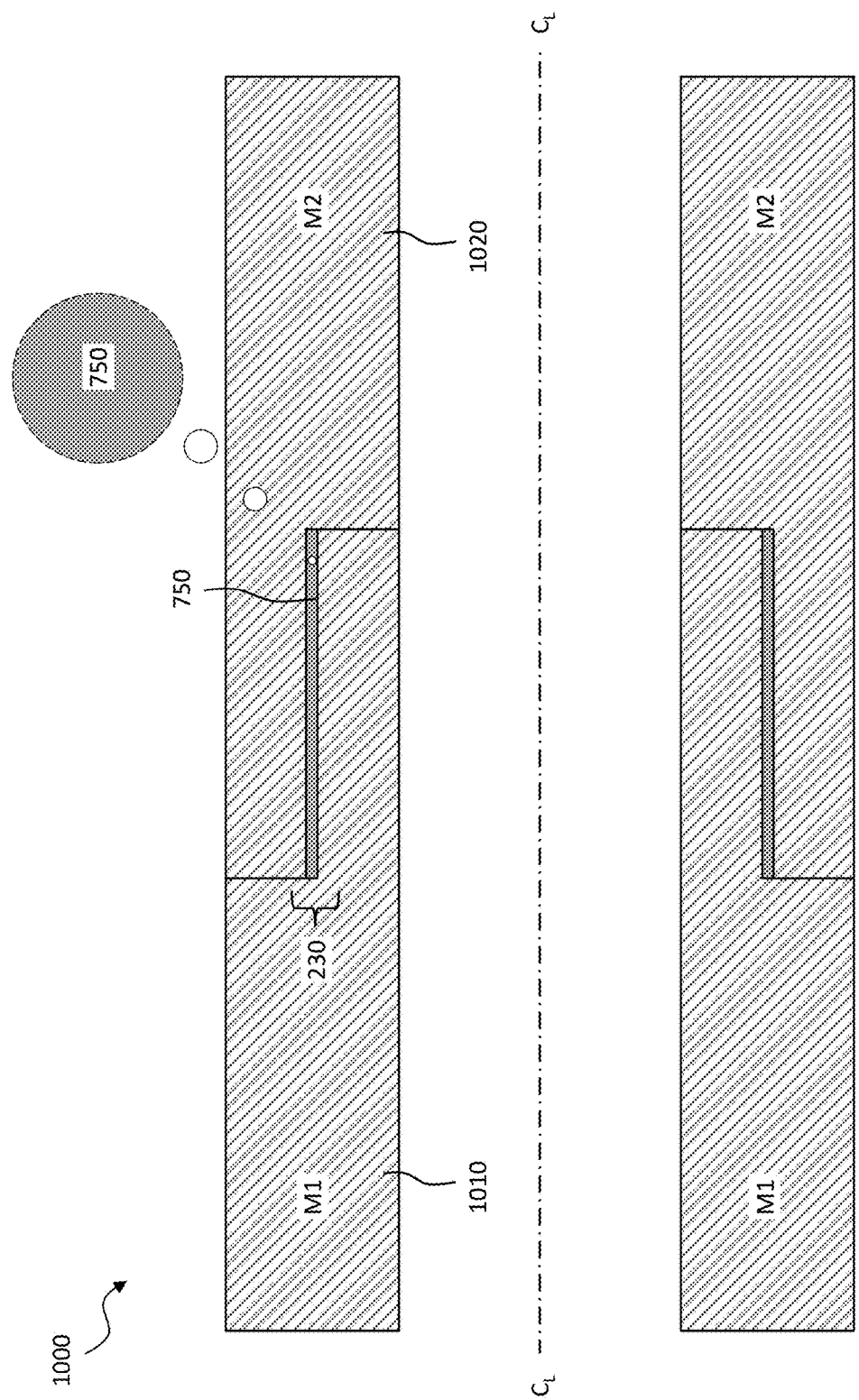
Figure 10C:
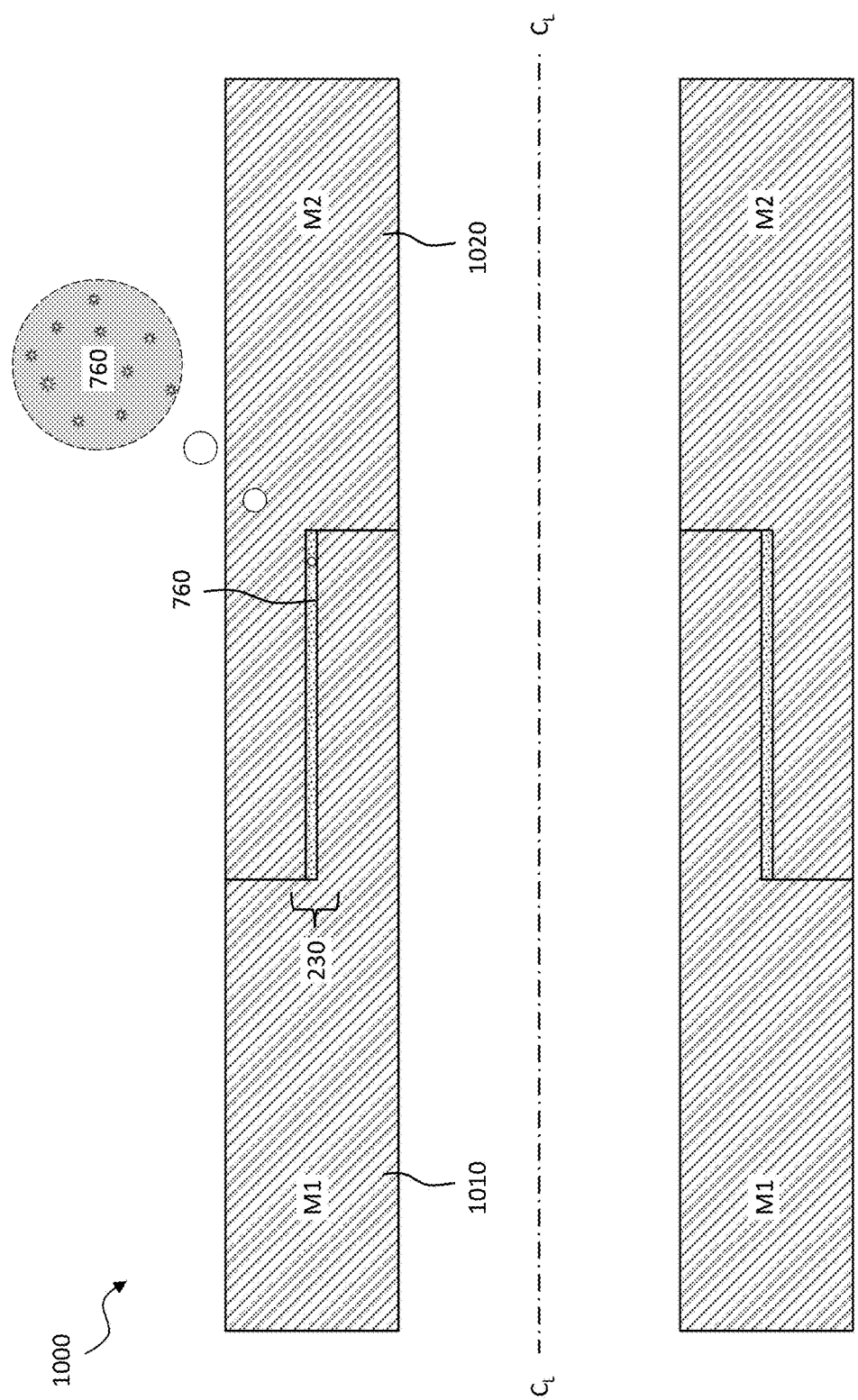

Turning now to FIGS. 10A through 10C, depicted are various different manufacturing states for a junction 1000 designed, manufactured and operated according to an alternative embodiment of the disclosure. FIG. 10A illustrates the junction 1000 pre-expansion, FIG. 10B illustrates the junction 1000 post-expansion, and FIG. 10C illustrates the junction 1000 post-expansion and containing residual unreacted expandable metal therein. The junction 1000 of FIGS. 10A through 10C is similar in many respects to the junction 700 of FIGS. 7A through 7C. Accordingly, like reference numbers have been used to illustrate similar, if not identical, features. The junction 1000 differs, for the most part, from the junction 700, in that the first member 1010 and the second member 1020 are non-threaded members.

Figure 11B:
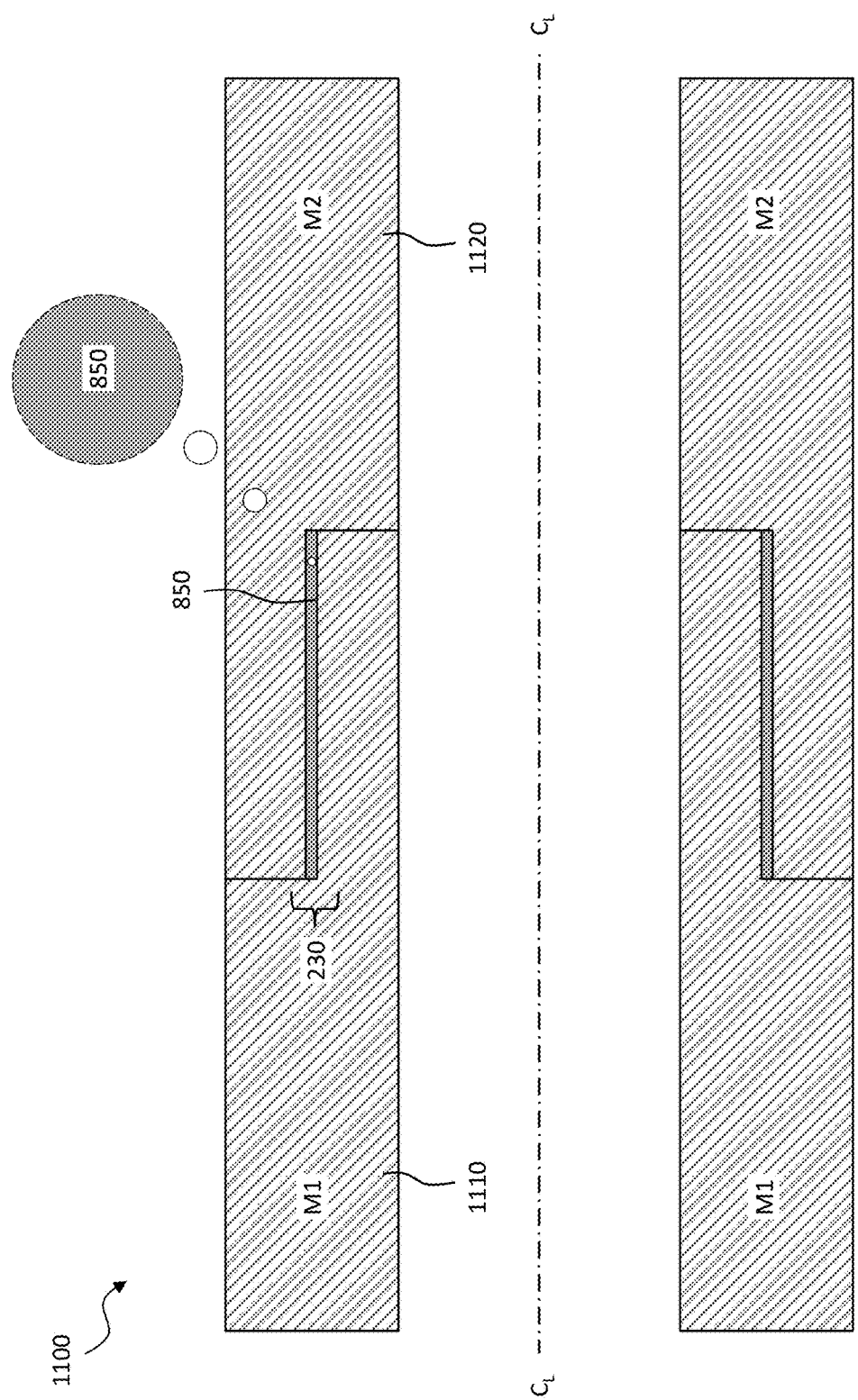
Figure 11C:
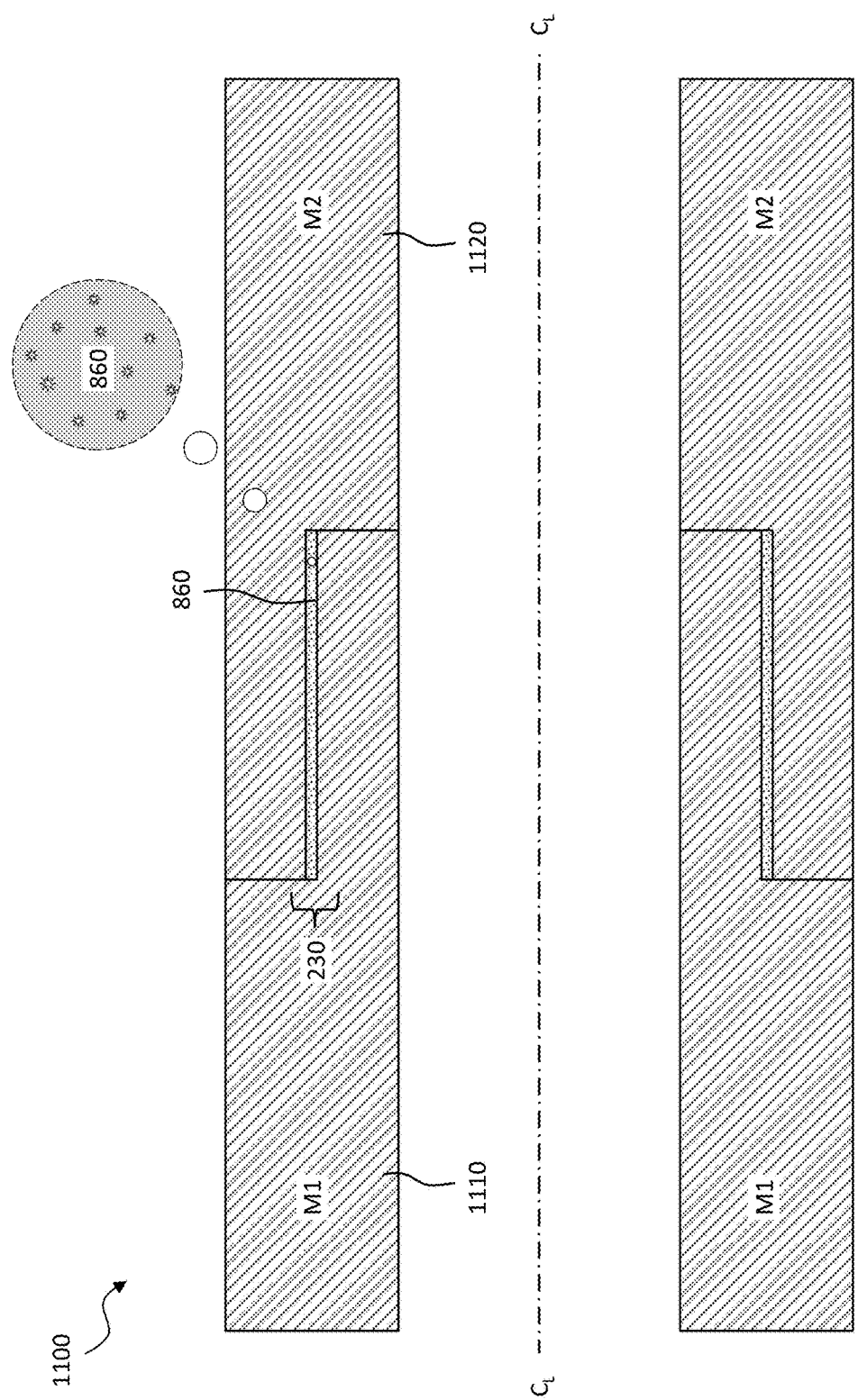

Turning now to FIGS. 11A through 11C, depicted are various different manufacturing states for a junction 1100 designed, manufactured and operated according to an alternative embodiment of the disclosure. FIG. 11A illustrates the junction 1100 pre-expansion, FIG. 11B illustrates the junction 1100 post-expansion, and FIG. 11C illustrates the junction 1100 post-expansion and containing residual unreacted expandable metal therein. The junction 1100 of FIGS. 11A through 11C is similar in many respects to the junction 800 of FIGS. 8A through 8C. Accordingly, like reference numbers have been used to illustrate similar, if not identical, features. The junction 1100 differs, for the most part, from the junction 800, in that the first member 1110 and the second member 1120 are non-threaded members.

Aspects disclosed herein include:

A. A junction, the junction including: 1) a first threaded member, the first member formed of a first material; 2) a second threaded member threaded with the first threaded member, the second threaded member formed of a second material, the first and second threaded members defining an overlapping space; and 3) an expandable metal joint located in at least a portion of the overlapping space, the expandable metal joint comprising a metal configured to expand in response to hydrolysis.

B. A method for forming a junction, the method including: 1) threading a first threaded member formed of a first material with a second threaded member formed of a second material, the threading defining an overlapping space, the overlapping space having an expandable metal joint located in at least a portion thereof, the expandable metal joint comprising a metal configured to expand in response to hydrolysis; and 2) subjecting the expandable metal joint to reactive fluid to expand the metal in the overlapping space and thereby form an expanded metal joint.

C. A well system, the well system including: 1) a wellbore extending through one or more subterranean formations; 2) a tubular positioned within the wellbore, the tubular including; a) a first threaded member formed of a first material; b) a second threaded member formed of a second material, the first and second threaded members threaded together and defining an overlapping space; and c) an expanded metal joint positioned at least partially in the overlapping space, the expanded metal joint comprising a metal that has expanded in response to hydrolysis.

Aspects A, B, and C may have one or more of the following additional elements in combination: Element 1: wherein the expandable metal joint is positioned between threads of the first and second threaded member. Element 2: wherein at least a portion of the overlapping space is parallel with a length ($L_1$) of the first threaded member or a length ($L_2$) of the second threaded member, thereby providing a set of straight threads. Element 3: wherein at least a portion of the overlapping space is angled relative to a length ($L_1$) of the first threaded member or a length ($L_2$) of the second threaded member, thereby providing a set of tapered threads. Element 4: wherein the expandable metal joint is an expandable metal threaded insert. Element 5: wherein the expandable metal threaded insert is positioned within a gland in the first threaded member or the second threaded member. Element 6: wherein the expandable metal joint is an expandable metal non-threaded insert. Element 7: wherein the expandable metal non-threaded insert is positioned within a gland in the first threaded member or the second threaded member. Element 8: wherein the expandable metal joint is a deposited expandable metal joint located along threads of the first threaded member or the second threaded member. Element 9: wherein the expandable metal joint comprises a collection of individual separate chunks of expandable metal held together with a carrier and/or binding agent. Element 10: wherein the expandable metal joint additionally includes a plurality of microspheres of encapsulated reactive fluid. Element 11: wherein the expandable metal joint is positioned at an end face where the first threaded member and the second threaded member engage one another. Element 12: wherein the expandable metal joint is an expandable metal threaded insert positioned within a gland in the first threaded member or the second threaded member. Element 13: wherein the expandable metal joint is an expandable metal non-threaded insert positioned within a gland in the first threaded member or the second threaded member. Element 14: wherein the expandable metal joint additionally includes a plurality of microspheres of encapsulated reactive fluid. Element 15: wherein threading the first threaded member with the second threaded member bursts one or more of the plurality of microspheres of encapsulated reactive fluid thereby subjecting the expandable metal joint to the reactive fluid to expand the metal in the overlapping space and thereby form the expanded metal joint. Element 16: wherein the expandable metal joint is positioned at an end face where the first threaded member and the second threaded member engage one another. Element 17: wherein the expanded metal joint includes residual unreacted expandable metal therein.

Those skilled in the art to which this application relates will appreciate that other and further additions, deletions, substitutions and modifications may be made to the described embodiments.

What is claimed is:

1. A junction, comprising:
   a first threaded member, the first member formed of a first material;
   a second threaded member threaded with the first threaded member, the second threaded member formed of a second material, the first and second threaded members defining an overlapping space; and
   a non-polymer expandable metal joint located in at least a portion of the overlapping space, the non-polymer expandable metal joint applied as a solid layer to at least one of the first threaded member or the second threaded member, the non-polymer expandable metal joint comprising a metal configured to expand in response to hydrolysis.

2. The junction as recited in claim 1, wherein the non-polymer expandable metal joint is positioned between threads of the first and second threaded member.

3. The junction as recited in claim 1, wherein at least a portion of the overlapping space is parallel with a length ($L_1$) of the first threaded member or a length ($L_2$) of the second threaded member, thereby providing a set of straight threads.

4. The junction as recited in claim 1, wherein at least a portion of the overlapping space is angled relative to a length ($L_1$) of the first threaded member or a length ($L_2$) of the second threaded member, thereby providing a set of tapered threads.

5. The junction as recited in claim 1, wherein the non-polymer expandable metal joint is an expandable metal threaded insert.

6. The junction as recited in claim 5, wherein the non-polymer expandable metal threaded insert is positioned within a gland in the first threaded member or the second threaded member.

7. The junction as recited in claim 1, wherein the non-polymer expandable metal joint is an expandable metal non-threaded insert.

8. The junction as recited in claim 7, wherein the expandable metal non-threaded insert is positioned within a gland in the first threaded member or the second threaded member.

9. The junction as recited in claim 1, wherein the non-polymer expandable metal joint is a deposited expandable metal joint located along threads of the first threaded member or the second threaded member.

10. The junction as recited in claim 1, wherein the non-polymer expandable metal joint comprises a collection of individual separate chunks of expandable metal held together with a carrier and/or binding agent.

11. The junction as recited in claim 10, wherein the non-polymer expandable metal joint additionally includes a plurality of microspheres of encapsulated reactive fluid.

12. The junction as recited in claim 1, wherein the non-polymer expandable metal joint is positioned at an end face where the first threaded member and the second threaded member engage one another.

13. A method for forming a junction, comprising:
    threading a first threaded member formed of a first material with a second threaded member formed of a second material, the threading defining an overlapping space, the overlapping space having a non-polymer expandable metal joint located in at least a portion thereof, the non-polymer expandable metal joint applied as a solid layer to at least one of the first threaded member or the second threaded member, the non-polymer expandable metal joint comprising a metal configured to expand in response to hydrolysis; and
    subjecting the non-polymer expandable metal joint to reactive fluid to expand the metal in the overlapping space and thereby form an expanded metal joint.

14. The method as recited in claim 13, wherein the non-polymer expandable metal joint is positioned between threads of the first and second threaded member.

15. The method as recited in claim 13, wherein the non-polymer expandable metal joint is an expandable metal threaded insert positioned within a gland in the first threaded member or the second threaded member.

16. The method as recited in claim 13, wherein the non-polymer expandable metal joint is an expandable metal non-threaded insert positioned within a gland in the first threaded member or the second threaded member.

17. The method as recited in claim 13, wherein the non-polymer expandable metal joint is a deposited expandable metal joint located along threads of the first threaded member or the second threaded member.

18. The method as recited in claim 13, wherein the non-polymer expandable metal joint comprises a collection of individual separate chunks of expandable metal held together with a carrier and/or binding agent.

19. The method as recited in claim 18, wherein the non-polymer expandable metal joint additionally includes a plurality of microspheres of encapsulated reactive fluid.

20. The method as recited in claim 19, wherein threading the first threaded member with the second threaded member bursts one or more of the plurality of microspheres of encapsulated reactive fluid thereby subjecting the non-polymer expandable metal joint to the reactive fluid to expand the metal in the overlapping space and thereby form the expanded metal joint.

21. The method as recited in claim 13, wherein the non-polymer expandable metal joint is positioned at an end face where the first threaded member and the second threaded member engage one another.

22. The method as recited in claim 13, wherein the non-polymer expanded metal joint includes residual unreacted expandable metal therein.

23. A well system, comprising:
    a wellbore extending through one or more subterranean formations;
    a tubular positioned within the wellbore, the tubular including;
      a first threaded member formed of a first material;
      a second threaded member formed of a second material, the first and second threaded members threaded together and defining an overlapping space, wherein a non-polymer expandable metal joint has been applied as a solid layer to at least one of the first threaded member or the second threaded member before positioning in the wellbore, the non-polymer expandable metal joint comprising a metal which expands in response to hydrolysis in the wellbore transitioning the non-polymer expandable metal joint to a non-polymer expanded metal joint; and
      the non-polymer expanded metal joint positioned at least partially in the overlapping space.

* * * * *